United States Patent
Singh et al.

(10) Patent No.: US 10,713,429 B2
(45) Date of Patent: Jul. 14, 2020

(54) JOINING WEB DATA WITH SPREADSHEET DATA USING EXAMPLES

(71) Applicant: Microsoft Technology Licensing, LLC, Redmond, WA (US)

(72) Inventors: Rishabh Singh, Kirkland, WA (US); Jeevana Priya Inala, Cambridge, MA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/633,875

(22) Filed: Jun. 27, 2017

(65) Prior Publication Data
US 2018/0232351 A1 Aug. 16, 2018

Related U.S. Application Data

(60) Provisional application No. 62/457,273, filed on Feb. 10, 2017.

(51) Int. Cl.
*G06F 40/18* (2020.01)
*H04L 29/12* (2006.01)
(Continued)

(52) U.S. Cl.
CPC ............ *G06F 40/18* (2020.01); *G06F 3/0482* (2013.01); *G06F 16/25* (2019.01); *G06F 16/337* (2019.01);
(Continued)

(58) Field of Classification Search
CPC ............ G06F 17/246; G06F 17/30702; G06F 17/30867; G06F 3/0482; G06F 16/248;
(Continued)

(56) References Cited

U.S. PATENT DOCUMENTS 6,701,485 B1   3/2004   Igra et al.
8,555,187 B2 * 10/2013  Margolin ................ H04L 67/10
                                                      715/748
(Continued)

FOREIGN PATENT DOCUMENTS

CN   101908078 A  * 12/2010
WO   2000045297 A1    8/2000

OTHER PUBLICATIONS

"Creating a Scraper for Multiple URLs, Simple Method", http://web.archive.org/web/20081217103517/http:/blog.outwit.com/?p=116http://web.archive.org/web/20081217103517/http:/blog.outwit.com/?p=116http://blog.outwit.com/?p=116, Published on: Dec. 17, 2008, 13 pages.
(Continued)

*Primary Examiner* — Justin S Lee
(74) *Attorney, Agent, or Firm* — Faegre Drinker Biddle & Reath LLP

(57) ABSTRACT

Provided are methods and systems for joining semi-structured data from the web with relational data in a spreadsheet table using input-output examples. A first sub-task performed by the system learns a string transformation program to transform input rows of a table to URL strings that correspond to the webpages where the relevant data is present. A second sub-task learns a program in a rich web data extraction language to extract desired data from the webpage given the example extractions. Hierarchical search and input-driven ranking are used to efficiently learn the programs using few input-output examples. The learnt programs are then run on the remaining spreadsheet entries to join desired data from the corresponding web pages.

20 Claims, 21 Drawing Sheets

(51) Int. Cl.
| | |
|---|---|
| H04L 29/08 | (2006.01) |
| G06F 3/0482 | (2013.01) |
| G06F 16/335 | (2019.01) |
| G06F 16/9535 | (2019.01) |
| G06F 16/25 | (2019.01) |

(52) U.S. Cl.
CPC ...... *G06F 16/9535* (2019.01); *H04L 61/1552* (2013.01); *H04L 67/02* (2013.01); *H04L 67/36* (2013.01)

(58) Field of Classification Search
CPC ... G06F 16/332; G06F 16/95; H04L 61/1552; H04L 67/02; H04L 67/36; G06Q 30/0201; G06Q 30/0611
USPC ........................................................ 715/212
See application file for complete search history.

(56) References Cited

U.S. PATENT DOCUMENTS

| | | | | |
|---|---|---|---|---|
| 8,645,367 | B1* | 2/2014 | Hajaj | G06F 16/951 707/727 |
| 8,799,234 | B2 | 8/2014 | Gulwani et al. | |
| 8,972,930 | B2 | 3/2015 | Gulwani | |
| 9,002,758 | B2 | 4/2015 | Gulwani et al. | |
| 9,489,366 | B2 | 11/2016 | Scott et al. | |
| 2002/0107754 | A1* | 8/2002 | Stone | G06F 17/246 705/34 |
| 2004/0158799 | A1 | 8/2004 | Breuel | |
| 2007/0260492 | A1* | 11/2007 | Feied | G16H 10/60 705/3 |
| 2010/0312788 | A1* | 12/2010 | Bailey | G06F 17/246 707/769 |
| 2013/0311454 | A1 | 11/2013 | Ezzat | |
| 2013/0311875 | A1* | 11/2013 | Pappas | G06F 17/2247 715/234 |
| 2013/0326475 | A1 | 12/2013 | Gulwani et al. | |
| 2013/0346982 | A1 | 12/2013 | Kalai et al. | |
| 2017/0220692 | A1* | 8/2017 | Greenwood | G06N 99/005 |

OTHER PUBLICATIONS

Bobbink, Jan-Willem, "Seven Tools for Web Scraping—to Use for Data Journalism & Creating Insightful Content", https://www.notprovided.eu/7-tools-web-scraping-use-data-journalism-creating-insighfful-content/, Published on: Jan. 21, 2014, 38 pages.

"Create your First Web Scraper to Extract Data from a Web Page", http://web.archive.org/web/20080915025159/http:/blog.outwit.com/?p=55, Published on: Sep. 15, 2008, 16 pages.

Hernandez, Luis, "4 Ways to Automagically Get Your Data into Spreadsheets", https://www.geckoboard.com/blog/4-ways-to-automagically-get-your-data-into-spreadsheets/, Published on: Feb. 23, 2016, 12 pages.

"How to Get Live Web Data into a Spreadsheet without ever Leaving Google Sheets", https://www.import.io/post/how-to-get-live-web-data-into-a-spreadsheet-without-ever-leaving-excel/, Retrieved on: Dec. 28, 2016, 10 pages.

Stojanovic, Ugljesa, "Identifying and Extracting Structured Data from web pages", In eRAF Journal on Computing, vol. 7, 2015, pp. 92-113.

Abedjan, et al., "DataXFormer: Leveraging the Web for Semantic Transformations", In Proceedings of 7th Biennial Conference on Innovative Data Systems Research, Jan. 4, 2015, 13 pages.

Alur, et al., "Syntax-Guided Synthesis", In Proceedings of Formal Methods in Computer-Aided Design, Oct. 20, 2013, pp. 1-8.

Anton, Tobias, "XPath-Wrapper Induction by Generalizing Tree Traversal Patterns", In Proceedings of Workshop on Learning, Knowledge and Adaptivity, Oct. 10, 2005, 8 pages.

Barman, et al., "Ringer: Web Automation by Demonstration", In Proceedings of ACM SIGPLAN International Conference on Object-Oriented Programming, Systems, Languages, and Applications, Nov. 2, 2016, pp. 748-764.

Berglund, et al., "XML Path Language (XPath)", In Proceedings of World Wide Web Consortium, Aug. 2003, 145 pages.

Chasins, et al., "Browser Record and Replay as a Building Block for End-User Web Automation Tools", In Proceedings of International World Wide Web Conference, May 18, 2015, pp. 179-182.

Crescenzi, et al., "RoadRunner: Towards Automatic Data Extraction from Large Web Sites", In Proceedings of 27th International Conference on Very Large Data Bases, Sep. 11, 2001, 10 pages.

Dalvi, et al., "Robust Web Extraction: An Approach Based on a Probabilistic Tree-Edit Model", In Proceedings of ACM SIGMOD International Conference on Management of Data, Jun. 29, 2009, pp. 335-347.

Gulwani, Sumit, "Automating String Processing in Spreadsheets using Input-Output Examples", In Proceedings of 38th ACM SIGPLAN-SIGACT Symposium on Principles of Programming Languages, Jan. 26, 2011, pp. 317-329.

Gulwani, et al., "Spreadsheet Data Manipulation Using Examples", In Journal of Communications of ACM, vol. 55, Issue 8, Aug. 2012, pp. 97-105.

Hsu, et al., "Generating finite-state transducers for semi-structured data extraction from the web", In Journal of Information Systems, vol. 23, Issue 8, Dec. 1998, pp. 521-538.

Kandel, et al., "Wrangler: Interactive Visual Specification of Data Transformation Scripts", In Proceedings of SIGCHI Conference on Human Factors in Computing Systems, May 7, 2011, pp. 3363-3372.

Kushmerick, Nicholas, "Wrapper Induction for Information Extraction", In PhD Thesis of University of Washington, 1997, 264 pages.

Lau, Tessa, "Why Programming by Demonstration Systems Fail: Lessons Learned for Usable AI", In AI Magazine, vol. 30, No. 4, 2009, pp. 65-67.

Le, et al., "Flashextract: A Framework for Data Extraction by Examples", In Proceedings of 35th ACM SIGPLAN Conference on Programming Language Design and Implementation, Jun. 9, 2014, 12 pages.

Leshed, et al., "Coscripter: Automating & Sharing How-to Knowledge in the Enterprise", In Proceedings of SIGCHI Conference on Human Factors in Computing Systems, Apr. 5, 2008, pp. 1719-1728.

Leung, et al., "Interactive Parser Synthesis by Example", In Proceedings of 36th ACM SIGPLAN Conference on Programming Language Design and Implementation, Jun. 13, 2015, pp. 565-574.

Lin, et al., "End-User Programming of Mashups with Vegemite", In Proceedings of the 14th International Conference on Intelligent User Interfaces, Feb. 8, 2009, pp. 97-106.

Morcos, et al., "DataXFormer: An Interactive Data Transformation Tool", In Proceedings of ACM SIGMOD International Conference on Management of Data, May 31, 2015, pp. 883-888.

Muslea, et al., "Stalker: Learning Extraction Rules for Semistructured, Web-based Information Sources", In Proceedings of AAAI Workshop on AI and Information Integration, Jan. 1998, pp. 74-81.

Osera, et al., "Type-and-Example-Directed Program Synthesis", In Proceedings of 36th ACM SIGPLAN Conference on Programming Language Design and Implementation, Jun. 13, 2015, pp. 619-630.

Polozov, et al., "Flashmeta: A Framework for Inductive Program Synthesis", In Proceedings of ACM SIGPLAN International Conference on Object-Oriented Programming, Systems, Languages, and Applications, Oct. 25, 2015, pp. 107-126.

Schkufza, et al., "Stochastic Superoptimization", In Proceedings of Eighteenth International Conference on Architectural Support for Programming Languages and Operating Systems, Mar. 16, 2013, pp. 305-315.

Singh, Rishabh, "BlinkFill: Semi-supervised Programming By Example for Syntactic String Transformations", In Proceedings of Very Large Data Bases Endowment, vol. 9, No. 10, Sep. 5, 2016, pp. 816-827.

Singh, et al., "Synthesizing Data Structure Manipulations from Storyboards", In Proceedings of 13th European Conference on Foundations of Software Engineering, Sep. 5, 2011, pp. 289-299.

Solar-Lezama, et al., "Combinatorial Sketching for Finite Programs", In Proceedings of 12th International Conference on Architectural Support for Programming Languages and Operating Systems, Oct. 21, 2006, pp. 404-415.

(56) References Cited

OTHER PUBLICATIONS

Udupa, et al., "TRANSIT: Specifying Protocols with Concolic Snippets", In Proceedings of 34th ACM SIGPLAN Conference on Programming Language Design and Implementation, Jun. 16, 2013, pp. 287-296.

Yaghmazadeh, et al., "Synthesizing Transformations on Hierarchically Structured Data", In Proceedings of 37th ACM SIGPLAN Conference on Programming Language Design and Implementation, Jun. 13, 2016, pp. 508-521.

Zhai, et al., "Web Data Extraction Based on Partial Tree Alignment", In Proceedings of 14th International Conference on World Wide Web, May 10, 2005, pp. 76-85.

\* cited by examiner

| | Address | Weather |
|---|---|---|
| 1 | 742 17th Street NE, Seattle, WA | 55 |
| 2 | 732 Memorial Drive, Cambridge, MA | 48 |
| 3 | Apt 12, 112 NE Main St., Boston, MA | 49 |

FIG. 6

```
612 → URL String u  ::=
614 → String e      ::=  Filter(e, φ) | e
616 → Predicate φ   ::=  Concat(f₁, ..., fₙ)
      Regex expr r  ::=  Concat(r₁, ..., rₙ)
618 → Atomic expr f ::=  f | AnyStr
                      |  ConstStr(s)
                      |  SubStr(pₗ, pᵣ)
                      |  Replace(pₗ, pᵣ, s₁, s₂)
622 → Position p    ::=  (τ, k, Dir) | ConstPos(k)
      Direction Dir ::=  Start | End
      Token τ       ::=  s | T₁ ... Tₙ
      Case c        ::=  lower | upper | prop | iden
```

```
                                        ↙ 610
[[Filter(e, φ)]]ᵥ     =  u s.t. u ∈ SearchResults([[e]]ᵥ)
                         and [[φ]]ᵥ ⊨ u
[[Concat(f₁, ..., fₙ)]]ᵥ = Concat([[f₁]]ᵥ, ..., [[fₙ]]ᵥ)
[[Concat(r₁, ..., rₙ)]]ᵥ = Concat([[r₁]]ᵥ, ..., [[rₙ]]ᵥ)
[[AnyStr]]ᵥ           =  Σ⁺
[[ConstStr(s)]]ᵥ      =  s
[[SubStr(pₗ, pᵣ, c)]]ᵥ =  changeCase(v[[[pₗ]]ᵥ..[[pᵣ]]ᵥ], c)
[[Replace(pₗ, pᵣ, s₁, s₂)]]ᵥ = v[[[pₗ]]ᵥ..[[pᵣ]]ᵥ][s₁ ← s₂]
[[ConstPos(k)]]ᵥ      =  k > 0 ? k : len(s) + k
[[(τ, k, Start)]]ᵥ    =  Start of k^{th} match of τ in v
[[(τ, k, End)]]ᵥ      =  End of k^{th} match of τ in v
```

700

702 →
```
GenProg({(v_i, o_i)}_i, λ_s, λ_c, λ_a)
  Dag d = GenDag(v_1, o_1, λ_s, λ_c, λ_a)
  for i from 2 to n:
    if d = null: return null
    Dag d' = GenDag(v_i, o_i, λ_s, λ_c, λ_a)
    d = d.Intersect(d')
  return RankBestProg(d)
```

704 →
```
GenDag(v, o, λ_s, λ_c, λ_a)
  V = {0, ..., len(o)}, v_s = {0}, v_t = {len(o)}
  E = {<i,j> : 0 ≤ i < j ≤ len(o)}
  W = maps each edge to set of atomic exprs
  foreach 0 ≤ i < j ≤ len(o):
    w = ∅
    if λ_s(i,j,o):  w.add(GenSubstr(i,j, v, o))
    if λ_s(i,j,o):  w.add(GenReplace(i,j, v, o))
    if λ_c(i,j,o):  w.add(ConstStr(v[i..j]))
    if λ_a(i,j,o):  w.add(AnyStr)
    W.add(<i, j>, w)
  return Dag(V, v_s, v_t, E, W)
```

FIG. 7

```
LearnString({⟨vᵢ, oᵢ⟩}ᵢ)
  if(p := GenProg({⟨vᵢ, oᵢ⟩}ᵢ, oW, oW, F) ≠ ⊥: return p
  if(p := GenProg({⟨vᵢ, oᵢ⟩}ᵢ, mW, oW, F) ≠ ⊥: return p
  if(p := GenProg({⟨vᵢ, oᵢ⟩}ᵢ, iW ∧ mW, oW, F) ≠ ⊥: return p
  return GenProg({⟨vᵢ, oᵢ⟩}ᵢ, T, T, F)
```

```
RankBestProg(d, {((vᵢ,oᵢ))}ᵢ, e)
  foreach ν ∈ V(d):
    ν.prefixes = ∅,
  foreach ν ∈ V(d) in reverse topological order:
    foreach e: <ν, ν'> ∈ E(d):
      foreach φ_sofar in ν.prefixes.RankedIterator:
        foreach f in W(e).RankedIterator:
          if Consistent(φ_sofar + f,
                        {(vᵢ,oᵢ)}ᵢ, e):
            ν'.prefixes.add(φ_sofar + f,
                            φ_sofar.score + f.score)
          if f ≠ AnyStr: Goto Line 13
      if AnyStr ∉ φ_sofar: Goto Line 5
  return d.ν_t.prefixes[0]
```

902, 904, 906 point to elements in the pseudocode above.

FIG. 9

$$\text{IntersectPath}(p, q) = \{a_i\}_i \text{ where } a_i = \text{IntersectAnchor}(a_{p_i}, a_{q_i})$$

$$\text{IntersectAnchor}(a_p, a_q) = \text{Anchor}(a_p.\text{name}, \{\pi_i\}_i) \text{ where } \pi_i = \text{IntersectPred}(\pi_{p_i}, \pi_{q_i})$$

$$\text{IntersectAttrPred}(\pi_p, \pi_q) = \text{AttrPred}(\pi_p.\text{name}, \text{Intersect}(\pi_p.\text{DAG}, \pi_q.\text{DAG})) \text{ if } \pi_p.\text{name} = \pi_q.\text{name}$$

$$\text{IntersectPosPred}(\pi_p, \pi_q) = \text{PosPred}(==, \pi_p.k) \text{ if } \pi_p.k = \pi_q.k \text{ else PosPred}(\leq, \max(\pi_p.k, \pi_q.k))$$

$$\text{IntersectCountPred}(\pi_p, \pi_q) = \text{CountPred}(\pi_p.k) \text{ if } \pi_p.k = \pi_q.k$$

FIG. 14

```
Search(Π, E, U)
Π' = ϕ; RankP(Π)
foreach π in Π.SortedIterator:
    P = Refine(Path(π), E)
    foreach π' in P(π)
        done = TestNAdd(π, E, U)
        if (done): return (E[0].γ.Name, Π')
```

FIG. 16

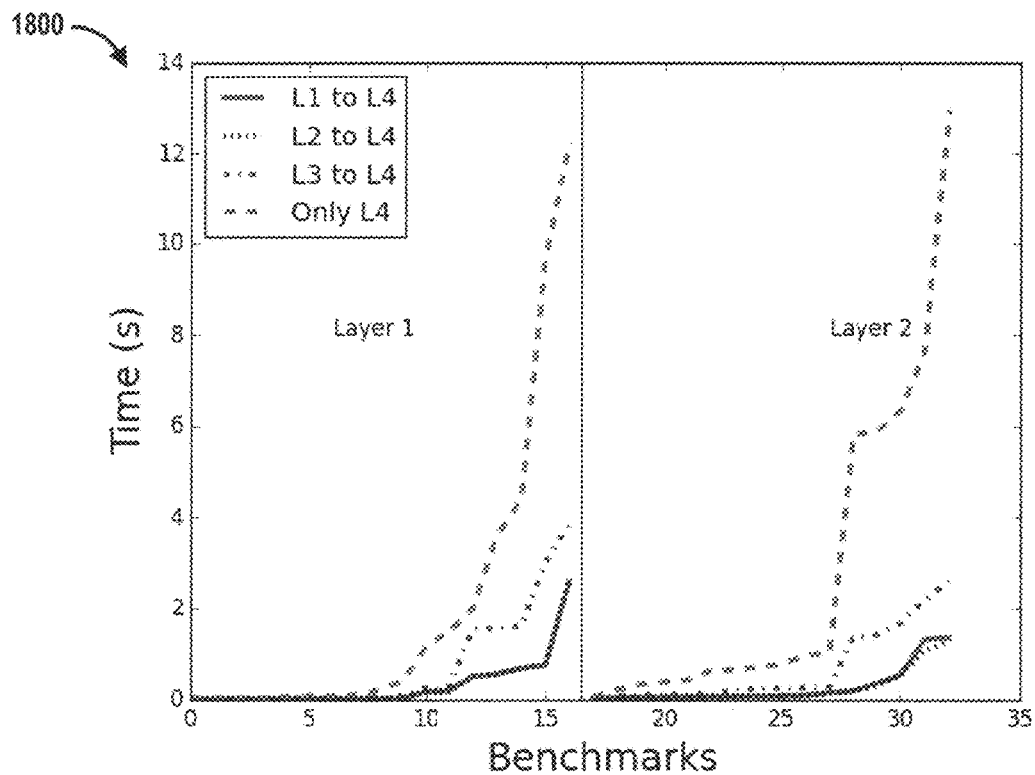
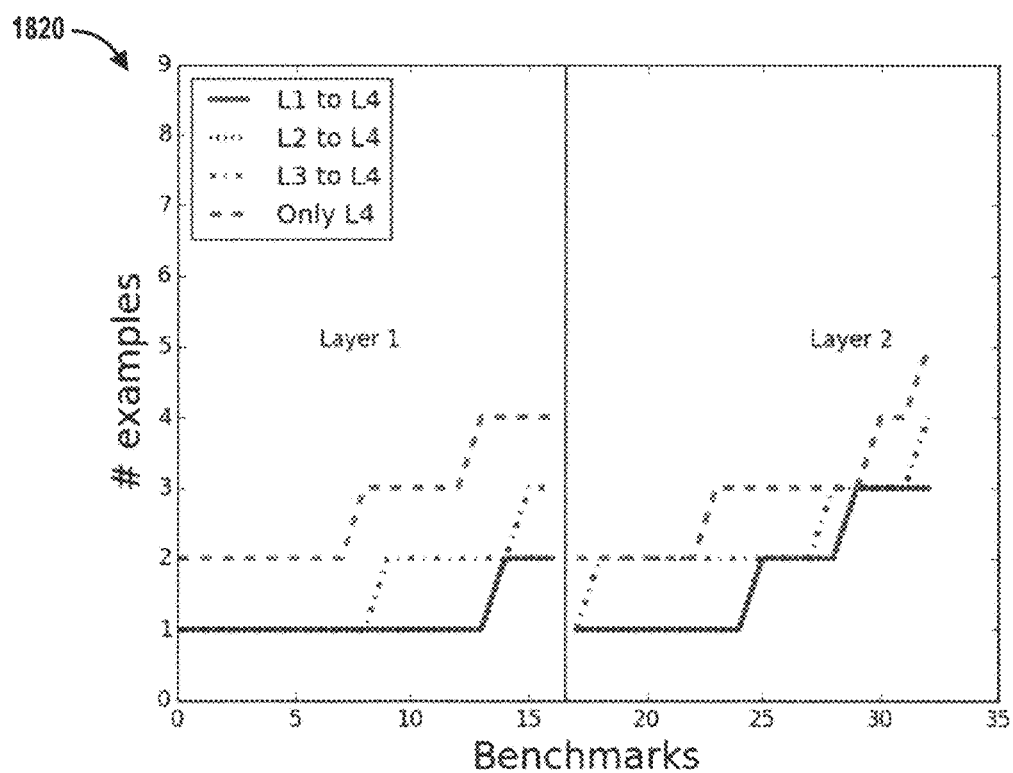
FIG. 18

JOINING WEB DATA WITH SPREADSHEET DATA USING EXAMPLES

This application claims the benefit of U.S. Provisional Patent Application No. 62/457,273, entitled "Joining Web Data With Spreadsheet Data Using Examples," filed on Feb. 10, 2017, which is hereby expressly incorporated herein by reference in its entirety.

BACKGROUND

Data integration is a key challenge faced by many data scientists, spreadsheet end-users, and others. Despite several recent advances in techniques for making it easier for users to perform data analysis, the inferences obtained from the analyses is only as good as the information diversity of the data. Nowadays, a lot of rich and useful data is available on the web, but typically in some semi-structured format. This gives rise to many interesting integration tasks that require combining spreadsheets with the rich data available on the web. However, currently, users have to either manually carry out these tasks or write complex scripts to find the desired web sources and scrape the required data from those sources. Unfortunately, many users (e.g., data scientists, spreadsheet end-users, etc.) come from diverse backgrounds and lack programming knowledge to write such complicated scripts.

There are three main challenges in programmatically joining web data with relational data in a table. First, most websites do not provide a direct interface to obtain the complete tabular data, so a user needs to formulate a logic to get to the webpages for each table row. Second, after reaching the desired webpage, the user needs to write an extraction logic that depends on the underlying DOM structure of the webpage to retrieve the relevant data. Third, the common data key to join the two sources (spreadsheet and webpage) might be in different formats, which requires writing additional logic to transform the data before performing the join.

Existing approaches have explored two different strategies for dealing with the first challenge of finding the webpages that contain the required data. A first existing approach takes a few input-output examples and uses a fully automatic approach by searching through a huge database of web forms that can transform the given examples. However, many websites do not expose web forms and do not have the data in a single table. Other existing approaches are programming by demonstration (PBD) systems that rely on users to demonstrate how to navigate to the desired web pages for a few examples. Although the PBD systems can handle a broader range of web pages compared to the first approach above, the PBD systems tend to put additional burden on users to perform exact demonstrations to get to the webpage, which has been shown to be problematic for users.

The existing approaches and systems also assume that the desired data in each webpage can be retrieved using a simple extraction logic. For instance, the first existing approach mentioned above uses an absolute XPath program to extract the data. However, this is a very strong assumption on the similarity of the different webpages. On the other hand, there are efficient systems for wrapper induction, which is a technique to learn robust and generalizable extraction programs from a few labeled examples. However, most of these techniques have only been applied in the context of extracting huge amounts of data from the web. Applying wrapper induction to data integration tasks poses new challenges as the data that needs to be extracted can be conditioned on the input data in the table.

SUMMARY

The following introduces a selection of concepts in a simplified form in order to provide a foundational understanding of some aspects of the present disclosure. The following is not an extensive overview of the disclosure, and is not intended to identify key or critical elements of the disclosure or to delineate the scope of the disclosure. The following merely presents some of the concepts of the disclosure as a prelude to the more detailed description provided thereafter.

The present disclosure relates generally to data integration and, more particularly, to techniques for joining relational data with semi-structured web data.

One embodiment of the present disclosure relates to a method for integrating web data into a document, the method comprising: learning a plurality of website addresses based on information about at least one website identified by a user; determining a data type to be extracted from a web page associated with the website based on an input data type from the user; and performing data extraction from a plurality of web pages associated with the plurality of website addresses based on the determined data type.

Another embodiment of the present disclosure relates to a system for integrating web data into a document, the system comprising one or more processors and a non-transitory computer-readable medium coupled to the one or more processors having instructions stored thereon that, when executed by the one or more processors, cause the one or more processors to perform operations comprising: learning a plurality of website addresses based on information about at least one website identified by a user; determining a data type to be extracted from a web page associated with the website based on an input data type from the user; and performing data extraction from a plurality of web pages associated with the plurality of website addresses based on the determined data type.

Yet another embodiment of the present disclosure relates to a tangible, non-transitory computer readable medium, or media, storing machine readable instructions that, when executed by one or more processors, cause the one or more processors to perform operations comprising: learning a plurality of website addresses based on information about at least one website identified by a user; determining a data type to be extracted from a web page associated with the website based on an input data type from the user; and performing data extraction from a plurality of web pages associated with the plurality of website addresses based on the determined data type.

Further scope of applicability of the methods and systems of the present disclosure will become apparent from the more detailed description given below. However, it should be understood that the following detailed description and specific examples, while indicating embodiments of the methods and systems, are given by way of illustration only, since various changes and modifications within the spirit and scope of the concepts disclosed herein will become apparent to those skilled in the art from the following detailed description.

BRIEF DESCRIPTION OF THE DRAWINGS

These and other objects, features, and characteristics of the present disclosure will become more apparent to those skilled in the art from a study of the detailed description that follows in conjunction with the appended claims and drawings, all of which form a part of this disclosure. In the drawings:

FIG. 6 illustrates syntax and semantics of an example domain-specific language (DSL) for a URL generation program, according to one or more embodiments described herein.

FIG. 7 illustrates an example synthesis process for learning URL string transformations in a sub-language, according to one or more embodiments described herein.

FIG. 9 illustrates an example process for searching for a predicate program from a DAG, according to one or more embodiments described herein.

FIG. 14 illustrates an example process for intersecting two paths in two predicates graphs, according to one or more embodiments described herein.

FIG. 16 illustrates an example process for searching for a set of predicates, according to one or more embodiments described herein.

FIG. 18 is a set of graphical representations illustrating example synthesis times and number of examples needed to learn search queries, according to one or more embodiments described herein.

Figure 1A:
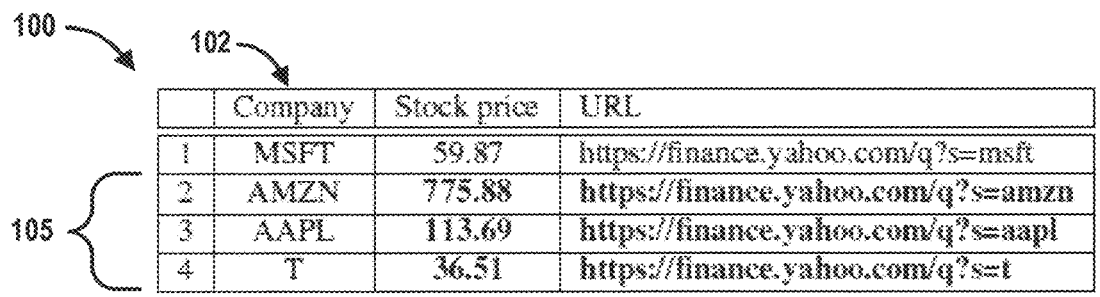
FIG. 1A is an example data table showing data to be integrated with web data, according to one or more embodiments described herein.

The headings provided herein are for convenience only and do not necessarily affect the scope or meaning of what is claimed in the present disclosure.

Embodiments of the present disclosure and their advantages are best understood by referring to the detailed description that follows. It should be appreciated that like reference numbers are used to identify like elements illustrated in one or more of the figures, wherein showings therein are for purposes of illustrating embodiments of the present disclosure and not for purposes of limiting the same.

DETAILED DESCRIPTION

Various examples and embodiments of the present disclosure will now be described. The following description provides specific details for a thorough understanding and enabling description of these examples. One of ordinary skill in the relevant art will understand, however, that one or more embodiments described herein may be practiced without many of these details. Likewise, one skilled in the relevant art will also understand that one or more embodiments of the present disclosure can include other features and/or functions not described in detail herein. Additionally, some well-known structures or functions may not be shown or described in detail below, so as to avoid unnecessarily obscuring the relevant description.

In view of the deficiencies associated with the existing approaches described above, embodiments of the present disclosure relate to methods and systems for joining semi-structured data from the web with the relational data in a spreadsheet table using input-output examples. For example, in an embodiment, the system described herein is designed such that it breaks down the original integration task into two sub-tasks. The first sub-task learns a program (e.g., a string transformation program) to transform input rows to URL strings that correspond to the webpages where the relevant data is present. Instead of relying on user interactions on a website, it takes a new approach to use URL examples to reach the desired webpages. The second sub-task learns a program in a rich web data extraction language to extract desired data from the webpage given the example extractions, according to an embodiment.

As will be described in greater detail below, the present disclosure designs expressive domain-specific languages for URL generation and web data extraction, and presents efficient synthesis processes (e.g., algorithms) for learning programs in these DSLs. To further demonstrate the effectiveness and some of the unique advantages of the system, the following description also presents an evaluation of the system on a substantial number real-world data integration tasks. The evaluation results show, among other things, that the system is capable of learning the desired programs within a few seconds from only one example for the majority of the tasks.

In the detailed description that follows, the URL learning problem is framed as a string transformation problem. In an embodiment, an expressive domain-specific language (DSL) is designed for URL generation, which is built on top of regular expression-based substring operations known to those of ordinary skill in the art. The language allows for expressing programs that can, in one or more embodiments, (i) generate desired URLs directly as string transformations or (ii) generate search queries as string transformations that can be used with any search engine to get a list of URLs and then, generate predicates to filter the search results to obtain the desired URLs. A synthesis process is then presented based on hierarchical search to efficiently learn programs in the DSL from few input-output examples. For the data extraction task, the system uses an expressive DSL built on top of XPath constructs that also allow for input-dependent data extraction, in an embodiment. In an embodiment, a synthesis process uses predicates graphs to succinctly represent a large number of DSL expressions that are consistent with a given set of input-output examples. The techniques presented use an input-driven ranking scheme to learn programs from few examples.

To further aid in understanding the various features and objects of the present disclosure, the system is evaluated on a large number of real-world web data integration tasks obtained from, for example, online help forums and anonymized sources. In at least one embodiment, with the system using hierarchical search it takes an average 0.22 seconds and 1.5 examples to learn URLs and search query terms as string transformations, whereas the system learns URLs based on filtering search results using 1.2 examples in less than 1 second each. The system of the present disclosure also learns 97% of web data extraction tasks in less than 5 seconds, where 93% of the benchmarks require only 1 example.

As will be described in greater detail below, the present disclosure provides improved methods and systems for joining web data with relational data. Further details will be provided in the sections that follow, which highlight the following non-limiting features of the methods and systems described herein: (i) the system divides the data integration task into a URL learning task and a web data extraction task; (ii) a DSL is designed for URL generation using string transformations and a synthesis algorithm is presented based on hierarchical search to learn URLs from a few examples; and (iii) a DSL is designed on top of XPath constructs that allow for input-dependent data extractions, and a synthesis algorithm is presented based on a predicates graph data structure to learn extraction programs from examples. In addition, results are presented on the evaluation of the methods and systems on a substantial number of real-world data integration tasks. The results indicate, among other things, that the system is capable to efficiently learn the desired programs to automate the tasks using few examples.

With reference to FIGS. 1A-3B, the following presents several hypothetical web data integration tasks to illustrate how the system of the present disclosure can be used to automate these tasks using examples, in accordance with one or more embodiments.

Figure 1B:
FIG. 1B is an example clip of a web page showing data to be integrated with the data contained in the table of FIG. 1A, according to one or more embodiments described herein.

FIGS. 1A and 1B illustrate an example (Example 1) of joining web data with relational data. In a first example scenario, a user wishes to retrieve current stock prices for hundreds of company symbols (Company column 102) as shown in data table (e.g., spreadsheet) 100 of FIG. 1A. In an embodiment, given one example row in the table, the system automatically completes the URL and extracts the stock prices for other row entries 105 (shown in bold in rows 2-4 of the table).

In accordance with an embodiment, in order to perform this integration task in the system, a user can provide an example URL such as, "https://finance.yahoo.com/q?s=msft", which has the desired stock price for the first row in the spreadsheet. This web-page then gets loaded and is displayed to the user in a neighboring window 110, as shown in FIG. 1B. The user can then highlight the required data from the web-page (denoted by broken-line box 120).

In accordance with an embodiment, the system learns the desired program to perform this task in two steps. First, the system learns a program to generate the URLs for remaining rows by learning a string transformation program that combines the constant string "https://finance.yahoo.com/q?s=" with the company symbol in the input. Second, the system learns a web data extraction program to extract the desired data from these web-pages.

Figure 2:
FIG. 2 is another example data table showing data to be integrated with web data, according to one or more embodiments described herein.

FIG. 2 illustrates a second example (Example 2) of joining web data with relational data. In this example, a user has a list of addresses in a spreadsheet 200 and wishes to get the weather information at each location, as shown in FIG. 2. The example URL provided by the user is "https://weather.com/weather/today/l/Seattle+WA+98109:4:US#!". In addition to the challenge of scraping the webpages, another challenge is that the addresses contain more information than just the city name and the state, such as, for example, the street name and house number.

In this second example, in accordance with at least one embodiment, the URL generator program first needs to learn regular expressions to extract the city-name and state from the address and then concatenate them appropriately with some constant strings to get the desired URL. In addition, the URL contains some strings such as zip codes that are not present in the input, meaning that there is no simple string transformation program that can learn the URLs for the remaining inputs. For supporting such cases, the system of the present disclosure, in at least one embodiment, allows a user to provide a search query term (such as "Seattle weather") as an example, and the system learns the remaining search queries for other inputs using a string transformation program. The system may then leverage the search engines to get a list of URLs and learns a filter program to obtain the desired URL. In accordance with an embodiment, a filter program is similar to a transformation program, but can also use regular expressions to denote unknown parts of the URL. In the present example, one possible filter program is https://weather.com/weather/today/l/{Extracted city name}+{Extracted state code}+{AnyStr}:4:US#!, where AnyStr can match any non-empty string. This filter program may be used to return the matched URL in the list of URLs obtained from the search query for each input. For example, for the second row in the spreadsheet 200, the system can learn that the URL is "https://weather.com/weather/today/l/Cambridge+MA+02139:4:US#!".

Figure 3A:
FIG. 3A is another example data table showing data to be integrated with web data, according to one or more embodiments described herein.
Figure 3B:
FIG. 3B is an example clip of a web page showing data to be integrated with the data contained in the table of FIG. 3A, according to one or more embodiments described herein.

FIGS. 3A and 3B illustrate yet another example (Example 3) of joining web data with relational data. In this third scenario, a user wishes to get currency exchange rates for pairs of currencies on some particular dates. FIG. 3A shows an example table/spreadsheet 300 for this task. As will be described in greater detail below, the system of the present disclosure integrates the spreadsheet 300 containing pair of currency symbols with the currency exchange rates from the web.

The example URL provided for the first row in the spreadsheet 300 is "http://www.investing.com/currencies/eur-usd-historical-data", and the corresponding web page 310 is shown in FIG. 3B. The URL can be learned as a string transformation program over the first two input columns of the example spreadsheet 300. The more challenging part of this integration task is that the data from the web page 310 should be extracted based on the Date column in the input. Moreover, the format of the date in the web page 310 (e.g., "Nov. 3, 2016") is different from the format of the date in the spreadsheet 300 (e.g., "03, November"). In accordance an embodiment, the data extraction DSL of the system allows to learn a program that first transforms the date to the required format and then extracts the conversion rate element whose left sibling contains the transformed date value.

Figure 4:
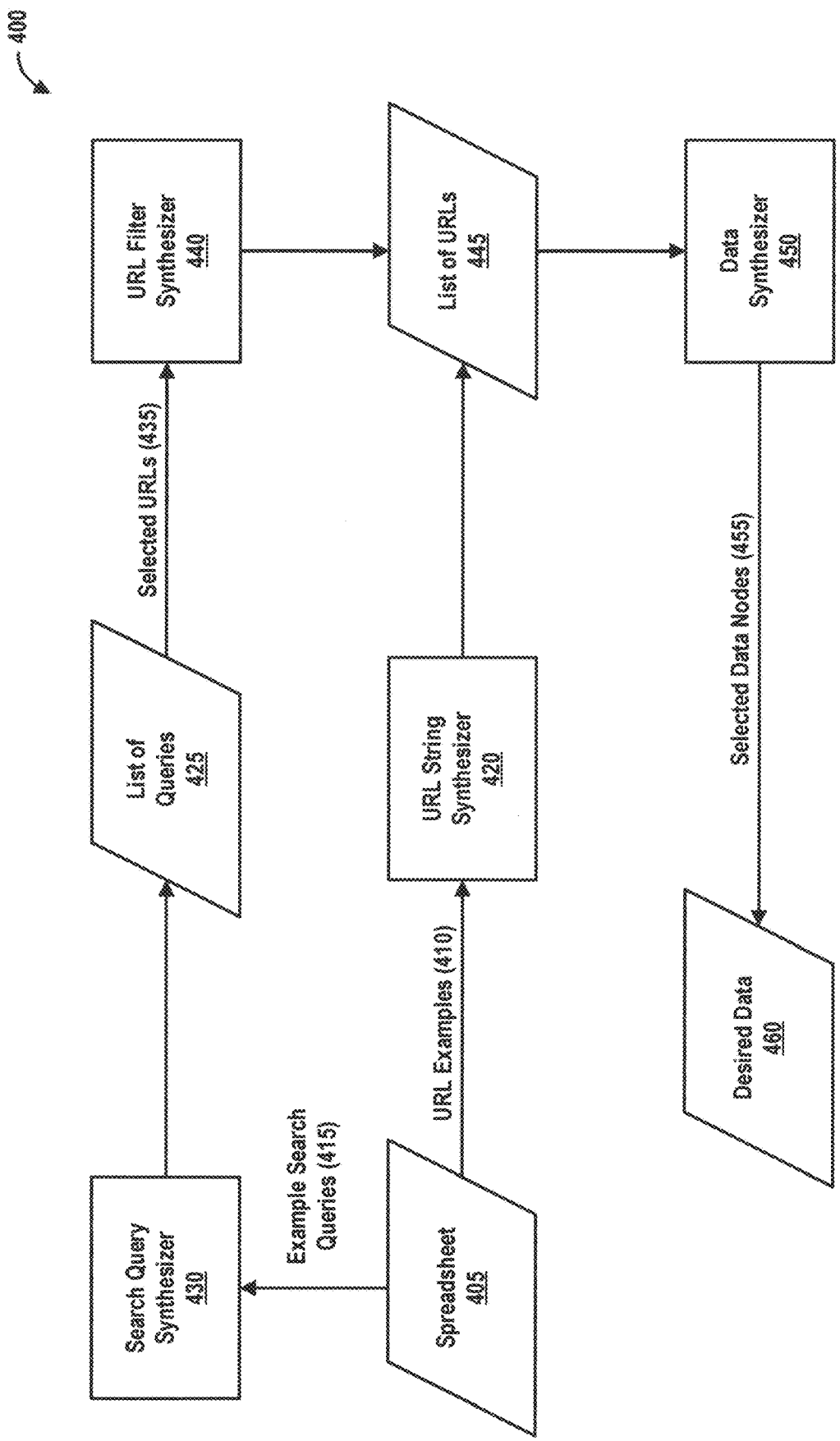
FIG. 4 is a block diagram illustrating an example system for joining web data with relational data, according to one or more embodiments described herein.

FIG. 4 illustrates an example system 400 for joining web data with relational data, together with example workflows in the system 400, according to at least some embodiments. In an embodiment, the system 400 may include one or more servers and/or one or more databases, some or all of which are network-connected (e.g., via a communication network).

It should also be understood that in one or more embodiments, the example system 400 may include other components in addition to or instead of the example components illustrated and described below. Similarly, the system 400 for joining web data with relational data may include fewer components than the number of example components shown, or one or more of the example components shown may be combined, without departing from the operations, features, or functionalities of the system as described herein. It should also be understood that the connections between the various servers, databases, and/or devices shown in the system 400 are merely an example of one way in which the servers, databases, and/or devices may be interconnected or arranged within the system 400, and that any or all of the components may be connected or arranged in numerous other ways in addition to or instead of the example manner shown.

As described above, in at least one embodiment, the system 400 decomposes the problem of learning programs to join web data with spreadsheet data into two sub-problems. The first sub-problem learns a program to transform input data to corresponding URL strings, while the second sub-problem learns a program to extract desired data from a web page.

For example, in an embodiment, a user starts with some tabular data in a spreadsheet (405). The user can provide URL examples in a variety of ways. For example, a user can provide example URLs (410) simply as strings for cases where the URLs can be constructed completely using some transformations on the input data (405) and constant strings. In accordance with an embodiment, a URL String Synthesizer module 420 may be configured to automatically generate the URLs for the other inputs (405) in the spreadsheet. In another example, the user can provide search query terms (415), which may result in a list of URLs or list of search queries (425) (e.g., generated using a search engine), and then select a URL (435) amongst the results for each example. In an embodiment, a Search Query Synthesizer module 430 and a URL Filter Synthesizer module 440 may be configured to learn the other search queries and URLs, respectively. In at least one embodiment, given a particular URL, the system 400 may load the web page in a neighboring frame (e.g., frame 110 as shown in FIG. 1) to prompt the user to highlight (e.g., select, identify, etc.) the desired data element to be extracted (e.g., selected data nodes) (455). The Data Synthesizer module 450 may be configured to learn a program to perform the desired extraction task for the other inputs (405) to extract the desired data (460) for inclusion with the input data (405) in the spreadsheet.

In some embodiments, the URL Filter Synthesizer module 440 and the Data Synthesizer module 450 may be configured to use the input spreadsheet data (405) for performing input-driven ranking to efficiently learn desired programs from few input-output examples.

Figure 5:
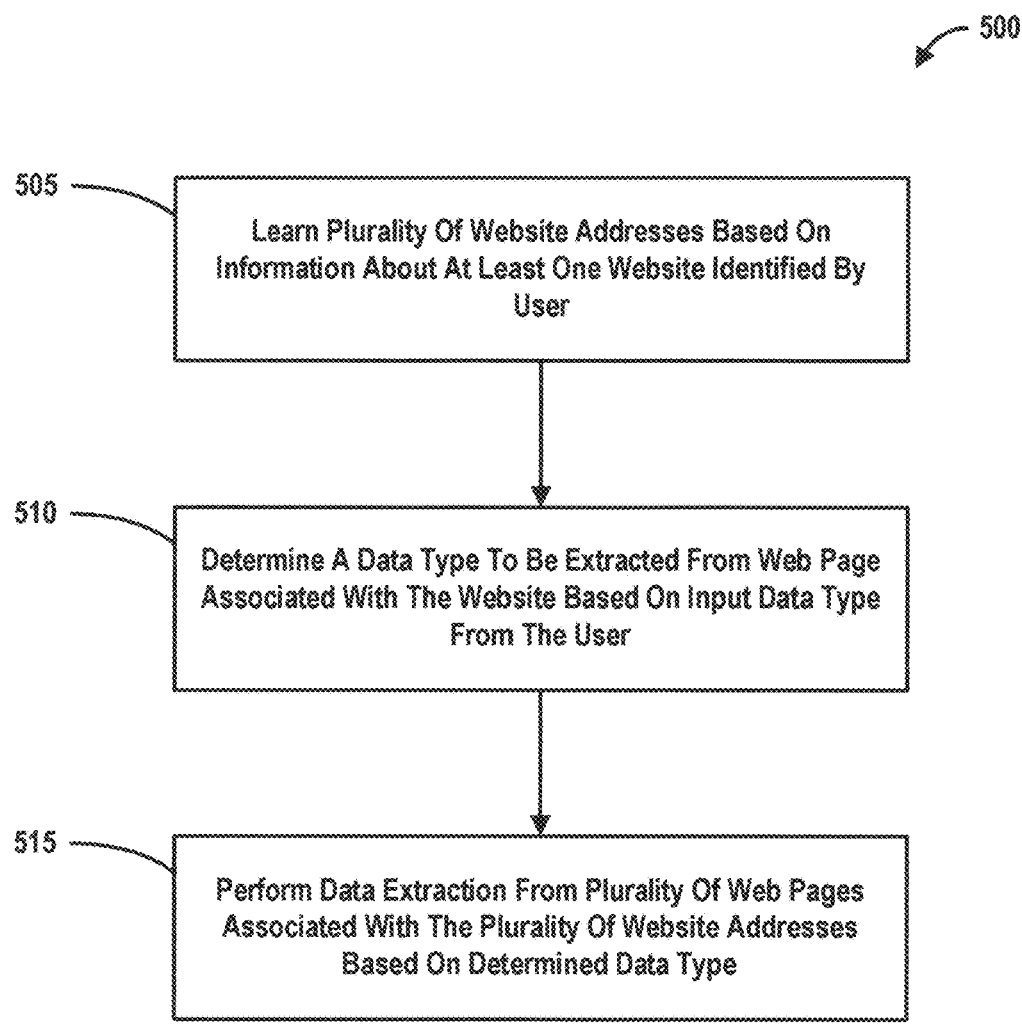
FIG. 5 is a flowchart illustrating an example process for joining web data with relational data, according to one or more embodiments described herein.

FIG. 5 illustrates an example method for joining web data with relational data, in accordance with one or more embodiments of the present disclosure.

At block 505, a plurality of website addresses may be learned based on information about at least one website identified by a user.

At block 510, a determination may be made as to a data type to be extracted from a web page associated with the website based. According to an embodiment, the data type to be extracted from the web page may be determined based on an input data type from the user.

At block 515, data extraction from a plurality of web pages associated with the plurality of website addresses (e.g., learned at block 505) may be performed. In an embodiment, the data extraction at block 515 may be performed based on the data type determined at block 510.

Additional details about the various operations shown in blocks 500-515 will be provided below.

URL Learning

The following describes the domain-specific language (DSL) for the URL generation programs and then presents a synthesis process based on hierarchical search to efficiently learn programs from few input-output examples, in accordance with one or embodiments of the disclosure.

URL Generation Language ($L_u$)

FIG. 6 illustrates the syntax 600 and semantics 610 of the DSL for URL generation $L_u$, in accordance with one or more embodiments. In the syntax 600 and semantics 610 of the DSL $L_u$ for regular expression based URL learning, s is a string, k is an integer, and $T_i$ represents a fixed set of tokens in the language. The DSL is built on top of regular expression based substring constructs introduced in a spreadsheet program (e.g., application) known to those of skill in the art. In an embodiment, the top-level URL string expression u 612 can be a filter expression, Filter (e, φ). In another embodiment, the top-level URL string expression u 612 can be a string expression e. The Filter expression takes as arguments a search query string e 614 and a predicate φ 616, where both e and φ are denoted using concatenate ("Concat") expressions. The difference between the two Concat expressions (the search query string e 614, and the predicate φ 616 is that while e is constructed using concatenation of only constant strings, regular expression based substring expressions, and replace expressions, φ can additionally contain AnyStr expressions. The atomic string expressions 618 can either be a constant string, a substring expression that takes two position expressions and a case expression, or a replace expression that takes two position expressions and two string arguments. A position expression 622 can either be a constant position index k or a regular expression based position (τ, k, Dir) that denotes the Start or End of kth match of token z in the input string.

In accordance with one or more embodiments, the semantics of a filter expression (e.g., 612), Filter (e, φ), is to first evaluate e to generate the search query term, which is sent to a search engine to obtain a ranked list of URLs. The evaluation of predicate φ results in a regular expression which is then used to return the first matched URL in the URL list. The semantics of a string expression e (e.g., 614) and a predicate expression φ (e.g., 616) is to first evaluate each individual atomic expression (e.g., 618) in the arguments and then return the concatenation of resulting atomic strings. The semantics of AnyStr expression is $\Sigma^+$ that can match any non-empty string. The semantics of a substring expression is to first evaluate the position expressions to obtain left and right indices and then return the corresponding substring. The semantics of a replace expression, Replace ($p_l$, $p_r$, $s_1$, $s_2$), is to first get the substring corresponding to the position expressions and then replace all occurrences of string $s_1$ with the string $s_2$ in the substring. It should be noted that strings $s_1$ and $s_2$ are permitted to take values from a finite set of delimiter strings such as " ", "-", "_", "#", etc., in an embodiment.

For example, a $L_u$ program to perform the URL learning task in Example 1, described above, is: Concat(ConstStr ("https://finance.yahoo.com/q?s="), SubStr(ConstPos (0), ConstPos(−1), lower)). According to an embodiment, the program concatenates the constant string with the lowercase of input string (−1 index in ConstPos denotes the last string index).

An example DSL program for the URL learning task in Example 2, which is also described above is: Filter(Concat ($e_1$,ConstStr("weather")), φ), where $e_1$≡SubStr(("",",−2,End),(",",−1,Start),iden), and φ≡Concat($f_1,f_2$,ConstStr("+"), $f_4$,ConstStr("+"),AnyStr, ConstStr(":4:US#!")), $f_2$≡$e_1$, $f_1$≡ConstStr("https://weather.com/weather/today/l/"), and $f_4$≡SubStr(("",",−1,End),ConstPos(−1),iden).

Synthesis Using Hierarchical Search

The following describes details regarding the synthesis process that learns $L_u$ programs from input-output examples, in accordance with one or more embodiments of the present disclosure. It should be noted that existing learning algorithms known to those of ordinary skill in the art are not suitable for URL learning tasks primarily because of two reasons. First, URL strings are long and the search space of existing algorithms is exponential in the length of the output. Second, URL strings typically have many constants, whereas existing algorithms are optimized to prefer substrings over constants. For instance, consider the URL in Example 1, described above. In this case, given the first example, existing algorithms will prefer programs that derive the character "t" in "http" from the last character in the input ("MSFT"), which is not desirable. As such, these existing algorithms will require more examples from users to learn the correct program.

As will be described in greater detail below, to overcome the issues mentioned above with respect to existing approaches, the present disclosure introduces a hierarchical search process for efficiently searching for the consistent programs, according to an embodiment. In an embodiment, an important aspect of the hierarchical search process is to perform search over increasingly expressive sub-languages $L_1 \subseteq L_2 \ldots \subseteq L_k$, where $L_k$ corresponds to the complete language $L_u$.

FIG. 7 illustrates an example synthesis process 700 for learning URL string transformations in a sub-language, according to one or more embodiments. In at least one embodiment, the synthesis process 700 for learning URL string transformations is parameterized by three Boolean functions $\lambda_s$, $\lambda_c$, and $\lambda_a$. In the example synthesis process 700 of FIG. 7, the general synthesis algorithm GenProg 702 for learning URL string transformations in a sub-language $L_i$ is shown. The synthesis process 700 may take as input a set of n input-output examples $\{v_i, o_i\}_i$, and the three Boolean functions $\lambda_s$, $\lambda_c$, and $\lambda_a$ that parameterize the search space, and returns a program that is consistent with the set of examples. In an embodiment, the process 700 may first use, for example, a GenDag procedure 704 to learn a Directed Acyclic Graph (DAG) consisting of all consistent programs for the first example. The process 700 may then iterate over other examples, and intersects the corresponding DAGs to compute a DAG representing programs consistent with all examples. The process 700 may then return the top-ranked program in the DAG, according to an embodiment.

In an embodiment, the synthesis process 700 constructs the DAG representing all consistent programs with a given input-output example (v, o), where the space of programs is constrained by the Boolean functions $\lambda_s$, $\lambda_c$, and $\lambda_a$. Each function λ: int→int→string→bool takes two integer indices and a string as input and returns a Boolean value denoting whether certain atomic expressions are allowed to be added to the DAG. In at least one embodiment, the process first creates len(o)+1 nodes, and then adds an edge between each pair of nodes <i, j> such that 0≤i<j≤len(o). Each edge in the DAG represents an atomic or a regex expression, whereas a path represents a Concat expression. For each edge <i, j>, the process learns all atomic expressions that can generate the substring o[i . . . j]. In an embodiment, for learning SubStr and Replace expressions, the process 700 enumerates different argument parameters for positions, cases, and delimiter strings, whereas the ConstStr and AnyStr expressions are always available to be added. The addition of SubStr and Replace atomic expressions to the DAG are guarded by the Boolean function $\lambda_s$, whereas the addition of ConstStr and AnyStr atomic expressions are guarded by the Boolean functions $\lambda_c$, and $\lambda_a$, respectively.

Learning String Expressions

Figures 8A, 8B:
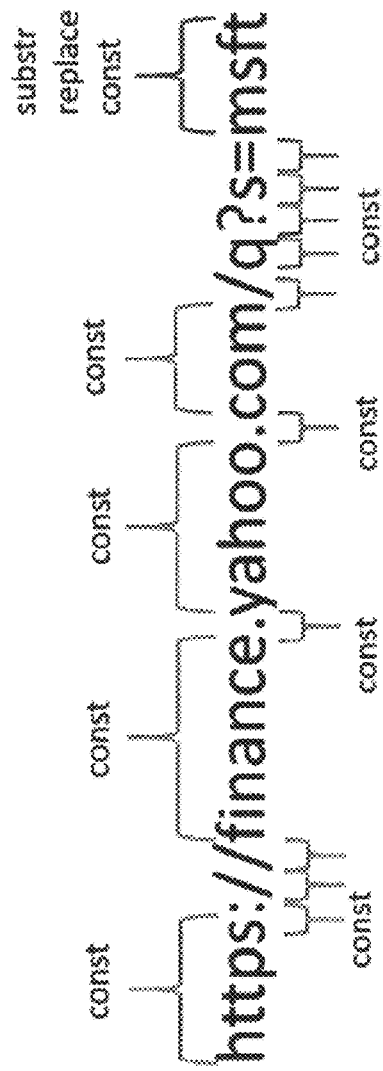
FIG. 8A illustrates an example hierarchical search process for learning string expressions, according to one or more embodiments described herein.
FIG. 8B illustrates an example Directed Acyclic Graph (DAG) created by the hierarchical search process of FIG. 8A, according to one or more embodiments described herein.

In accordance with one or more embodiments, a hierarchical search process 800 for learning string expressions e may be instantiated in the DSL, as shown in FIG. 8A. In at least one embodiment, for the first layer, the process 800 may only search for string expressions where each word in the output is either a substring or a constant. For example, the onlyWords (oW) function can be defined as:

$$oW=(i,j,o) \Rightarrow \neg isAlpha(o[i-1]) \wedge \neg isAlpha(o[j+1])$$
$$\wedge \forall k: i \leq k \leq j \, isAlpha(o[k])$$

It should be noted that the $\lambda_a$ always returns False (F) because a string expression cannot contain AnyStr. In accordance with an embodiment, the second layer allows for multiple words in the output string to be learned as a substring. For example, the function multipleWords (mW) can be defined as:

$$mW=(i,j,o) \Rightarrow \neg isAlpha(o[i-1]) \wedge \neg isAlpha(o[j+1])$$

The third layer, in addition, allows for words in the output string to be concatenation of multiple substrings, but not a concatenation of substrings with constant strings, in an embodiment. For example, the function insideWords (iW) can be defined as:

$$iW=(i,j,o) \Rightarrow \forall k: i \leq k \leq j \, isAlpha(o[k])$$

In at least one embodiment, the last layer allows arbitrary compositions of constants and substring expressions by setting the functions $\lambda_s$ and $\lambda_c$ to always return True (T).

Consider again the stock prices example described above (Example 1), where the example URL for the input MSFT is "https://finance.yahoo.com/q?s=msft". In accordance with an embodiment, the first layer of the hierarchical search process 800 will create a DAG 810, as shown in FIG. 8B. As illustrated, this DAG 810 eliminates most of the unnecessary programs such as, for example, those that consider the "t" in "https" to come from the "T" in "MSFT".

Consider again the currency exchange rates example described above (Example 3), and assume that it is desired to obtain the currency exchange values from "http://finance.yahoo.com/q?s=EURUSD=X". For this example, layers 1 and 2 of the hierarchical search process 800 can only learn the string EURUSD as a ConstStr, which will not work for the other inputs. So, the hierarchical search process 800 moves to layer 3 which allows SubStr inside words. Now, the system can learn EUR and USD separately as SubStr expressions and concatenate them.

In accordance with one or embodiments, the LearnString algorithm is considered to be sound. For example, given a few input-output examples $\{(v_i, o_i)\}_i$, the learnt program e will always satisfy $\forall i. [\![e]\!]_{v_i} = o_i$.

In accordance with one or embodiments, the LearnString algorithm is considered to be complete. For example, if there exists a string expression that satisfies the given input-output examples, then the algorithm is guaranteed to learn it given enough examples.

Learning Filter Expressions

In accordance with one or more embodiments, the following describes an example process for learning filter expressions Filter(e, φ). For example, in an embodiment, the search query term e may be learned using the LearnString process shown in FIG. 8A, and described in detail above. The predicate expression φ may be learned using, for example, the LearnPred algorithm. In an embodiment, the layers for this algorithm are similar to the layers in LearnString except that $\lambda_a$ is no longer always False, but is similar to the $\lambda_c$ for each layer. The LearnPred algorithm learns all possible predicate programs that match the example URLs. However, not all of these programs are consistent for the given examples.

In at least one embodiment, given a list of input output examples $\{(v_i, o_i)\}_i$ and a search query program e obtained by the LearnString process, it can be said that a filter predicate φ is consistent if, for all examples, $o_i$ is the first URL in SearchResults[[e]]$_{v_i}$ that matches φ.

For instance, AnyStr is one of the possible predicate programs that will be learned by the algorithm, but in addition to matching the example URLs, this predicate will also match any URL in the search results, according to an embodiment. Hence, it is important to carefully select a consistent program from the DAG.

FIG. 9 illustrates an example process 900 for searching for a predicate program from a DAG. In an embodiment, the process 900 is for searching for a best (e.g., optimal) and consistent predicate program from the DAG learned by LearnPred. In at least one embodiment, the process 900 takes as input a DAG d (902), a list of examples (904), and a search query program e (906), and the outcome is the best program in the DAG that is consistent with the given examples (assuming that such a program exists). In an embodiment, the process 900 is considered a modification to the Dijkstra shortest path algorithm and uses a ranking scheme described in greater detail below to rank each atomic program in the DAG. In an embodiment, the process 900 maintains a ranked list of at-most k prefix programs for each node v in the DAG where a "prefix program" is a path in the DAG from the start node to v and the rank of a prefix program is the sum of ranks of all atomic expressions in the program. In an embodiment, initially, the set of prefix programs for every node is Ø. The process 900 then traverses the DAG in reverse topological order and for each outgoing edge, it iterates through pairs of prefixes and atomic expressions based on their ranks and checks if the pair is consistent with the given examples. According to an embodiment, whenever a consistent pair is found, the concatenation of the atomic expression with the prefix is added to the list of prefixes for the other node in the edge. The process 900 returns the best prefix for the target node of the DAG, according to an embodiment.

In one or more embodiments, in the limit k→∞, the example process 900 described above will always find a consistent program if it exists. It should be noted, however, in practice, a smaller value of k may be sufficient because of the two pruning steps at Line 12 and Line 13 of the process 900, and because of the ranking that gives least preference to AnyStr.

Input Driven Ranking

In at least some embodiments, one basic ranking scheme is to prefer atomic expressions in the following order: SubStr>Replace>ConstStr>AnyStr, where least priority is given to AnyStr. However, this basic ranking scheme is not very efficient for learning filter predicates. For instance, consider Example 2, described above. If there is a single example URL such as https://weather.com/weather/today/l/Seattle+WA+98109:4:US#!, then the basic ranking scheme will prefer the zip code "98109" to be a constant instead of AnyStr. On the other hand, it is preferable for strings such as "today, weather" to be constants and not AnyStr. This issue can be overcome by devising a data-driven ranking scheme. The idea is to leverage the additional information available in the form of search queries and search results for the other inputs to prune away predicate programs that do not result in valid URLs for these other inputs. In order to do this, an additional check may be added after Line 9 in the example process 900 (shown in FIG. 9 and described in detail above) that makes sure that also occurs in the search results for the other inputs. With this additional check, now, the constant 98109 will most probably not occur in the search results for other addresses such as Cambridge and hence, that atomic expression will not be considered in the best program.

It should be understood that the LearnPred algorithm is accurate and sound. That is, given some examples and a search query program, the learnt predicate is always consistent with the examples, according to an embodiment It should also be understood that the LearnPred algorithm is complete in the limit k→∞, where k prefixes are stored for each node in the RankBestProg algorithm, according to an embodiment Data Extraction Learning In accordance with one or more embodiments, now that there is a list of URLs, the next step is to synthesize a program to extract the relevant data from these web pages. In one embodiment, this data extraction can be done, for example, using a query language such as XPath that uses path expressions to select an HTML node (or a list of HTML nodes) from an HTML document. Learning an XPath program from a set of examples is called wrapper induction, and there exist many techniques known in the art that solve this problem. However, none of the existing approaches have applied wrapper induction in the context of data-integration tasks that requires generating data-dependent XPath programs, as is done in accordance with one or more embodiments described herein.

The methods and systems of the present disclosure provide numerous contributions for learning web data extraction programs including, for example: (1) presenting a DSL that extends the XPath language with input-dependent constructs, and (2) presenting a sound and complete synthesis algorithm that can learn robust and generalizable extraction programs in this DSL using very few examples.

Data Extraction Language $L_w$

Figure 10:
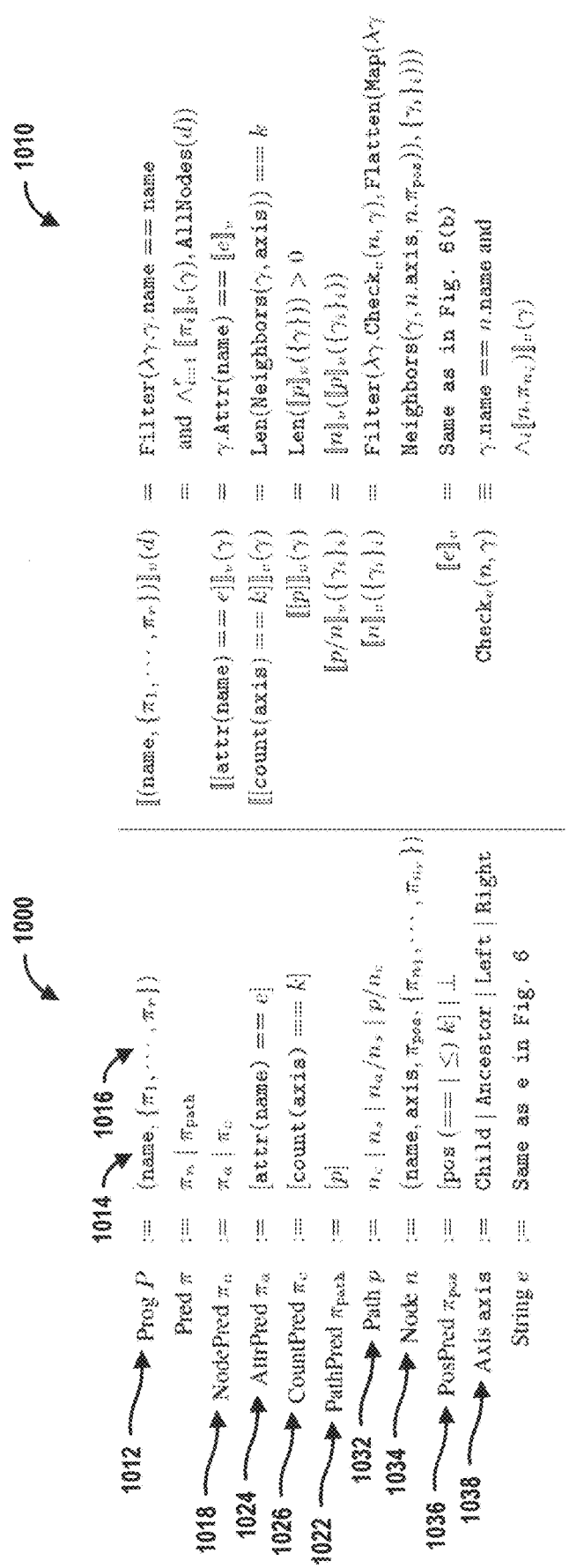
FIG. 10 illustrates syntax and semantics of an example data extraction language, according to one or more embodiments described herein.

FIG. 10 illustrates example syntax 1000 and semantics 1010 for the data extraction language $L_w$, in accordance with one or more embodiments.

In the example syntax 1000, "name" is a string, k is an integer, and ⊥ is an empty predicate, according to an embodiment. At the top-level, a program 1012 is a tuple containing a name 1014 and a list of predicates 1016. For example, in an embodiment, the name 1014 is the HTML tag, and the predicates 1016 are the constraints that the desired "target" nodes should satisfy. In an embodiment, there are two kinds of predicates NodePred 1018 and PathPred 1022. A NodePred 1018, for example, can either be an AttrPred 1024 or a CountPred 1026. An AttrPred 1024 has a name and a value, according to an embodiment. The notation is slightly abused and the text inside a node is treated as yet another attribute. The attribute values are not just strings but are string expressions from the DSL $L_u$ in FIG. 6, which mean these attributes can be written as string transformation programs from the input data. It should be noted that this is a key difference between the XPath language and $L_w$. A CountPred 1026 indicates the number of neighbors of a node along a particular direction, according to an embodiment. Predicates can also be PathPreds 1022, which indicates that a particular path exists in the HTML document starting from the current node. A path 1032 is a sequence of nodes 1034 where each node 1034 has a name, an axis 1038, a PosPred 1036, and a list of NodePreds (possibly empty). In at least one embodiment, the name represents the HTML tag, the axis 1038 is the direction of this node 1034 from the previous node in the path expression, and the PosPred 1036 indicates the distance between the nodes along the axis 1038. In an embodiment, the PosPred 1036 can also be empty (⊥), meaning that the node 1034 can be at any distance along the axis 1038. In one embodiment, $L_w$ only considers paths that have at-most one node along the Ancestor axis ($n_a$) and at-most one sibling node along the Left or the Right axis ($n_s$). Moreover, these ancestor and sibling nodes can only occur at the beginning of the path, according to an embodiment.

In the example semantics 1010, "AllNodes", "Len" and "Neighbors" are macros with expected semantics, in an embodiment. A program P is evaluated under a given input data v on an HTML document d, and it produces a list of HTML nodes that have the same name and satisfies all the predicates in P. In this formulation, γ is used to represent an HTML node, and it is not to be confused with the node n in the DSL. The predicates are evaluated on an HTML node and results in a Boolean value. Evaluating an AttrPred checks whether the value of the attribute in the HTML node matches the evaluation of the string expression under the given input v. A CountPred verifies that the number of children of the HTML node along the axis (e.g., obtained using the Neighbors macro) matches the count k. A PathPred first evaluates the path which results in a list of HTML nodes and checks that the list is not empty. A path is evaluated step-by-step for each node where each step evaluation is based on the set of HTML nodes obtained from the previous steps. Based on the axis of the node in the current step evaluation, the set of HTML nodes is expanded to include all their neighbors along that axis and at a position as specified by the PosPred. Next, this set is filtered according to the name of the node and its node predicates (e.g., using the Check macro).

Consider the currency exchange example described above (Example 3). A possible program for this data extraction task is (td, [(td,Left,[pos==1])/(text,Child, [attr("text")==<Transformed Date>]))]). This expression conveys interest in an HTML node ($γ_1$) with a td tag. The path predicate says there should be another td HTML node ($γ_2$) to the left at a distance of 1 from this node and it should have a text child with its text attribute equal to the date that is learned from the input.

It should be noted that, in accordance with an embodiment, this example DSL is only a subset of the XPath language that has been chosen so that it can handle a wide variety of data extraction tasks and at the same time enables efficient synthesis algorithm. For example, in one or more embodiments, the top-level program is a single node whereas the XPath language would support arbitrary path expressions. Moreover, paths in XPath do not have to satisfy the ordering criteria that $L_w$ enforces and, in addition, the individual nodes in the path expression in $L_w$ cannot have recursive path predicates, according to an embodiment. However, it has been found that most of these constraints can be expressed as additional path predicates in the top-level program.

Synthesis Process

Figure 11:
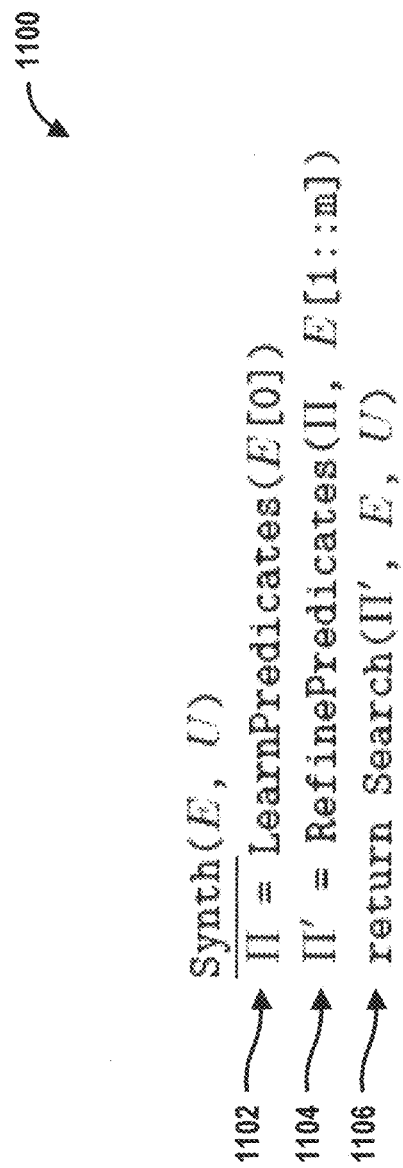
FIG. 11 illustrates an example synthesis process for learning a program, according to one or more embodiments described herein.

The following describes an example synthesis process for learning a program in $L_w$ from examples, in accordance with one or more embodiments of the present disclosure. Concretely, given a list of m examples E={($i_1$, $ω_1$, $γ_1$), ($i_2$, $ω_2$, $γ_2$), ... ($i_r$, $ω_r$, $γ_m$)}, where each example is a tuple of an input I, a web page ω, and a target HTML node γ, and a list of n pairs of unseen inputs and web pages U={($i_{m+1}$, $ω_{m+1}$), ($i_{m+2}$, $ω_{m+2}$), ... ($i_{m+n}$, $ω_{m+n}$)}, the task is to find a program P in $L_w$ such that ∀k≤m. [[P]]$_{i_k}$($ω_k$)={$γ_k$}. This synthesis task can be framed as a search problem to find the right set of predicates ({$π_1$, $π_2$, ... $π_r$}) that can sufficiently constrain the given target nodes. FIG. 11 illustrates an example of this synthesis process 1100 at a high-level.

Referring to the example synthesis process 1100 shown in FIG. 11, the process 1100 may include three steps, in accordance with one or more embodiments. At step 1102, the process 1100 may use the first example to learn all possible predicates for the target node in that example. At step 1104, the remaining examples may be used to refine the predicates learned at step 1102. At step 1106, the process 1100 may search for a subset of the refined predicates from step 1104 that satisfies the given examples and also generalizes well to the unseen inputs.

Learning All Predicates

For any given example HTML node, there are numerous predicates (especially path predicates) in the language that constrains this target node. In order to learn and operate on these predicates efficiently, a graph data structure called a predicates graph may be used to compactly represent the set of all predicates, in accordance with one or more embodiments. While this data structure is inspired by the tree data structure known to those of ordinary skill in the art, in the context of the present disclosure, the data structure is specialized for the DSL described above.

To avoid confusion with the nodes in the DSL, the term "Anchor" is used herein to refer to nodes and the term "Hop" is used to refer to edges in this graph. Hence, a predicates graph is a tuple (A, H, T) where A is the list of anchors, H is the list of hops, and T∈A is the target anchor. It should be noted that an anchor is a tuple (n, P) where n is the name of the anchor and P is a list of node predicates in the $L_w$ language. Also, an edge is a tuple $(a_1, a_2, x, d)$ where $a_1$ is the start anchor, $a_2$ is the end anchor, x is the axis, and d is a predicate on the distance between $a_1$ and $a_2$ measured in terms of number of hops in the original HTML document.

Figure 12:
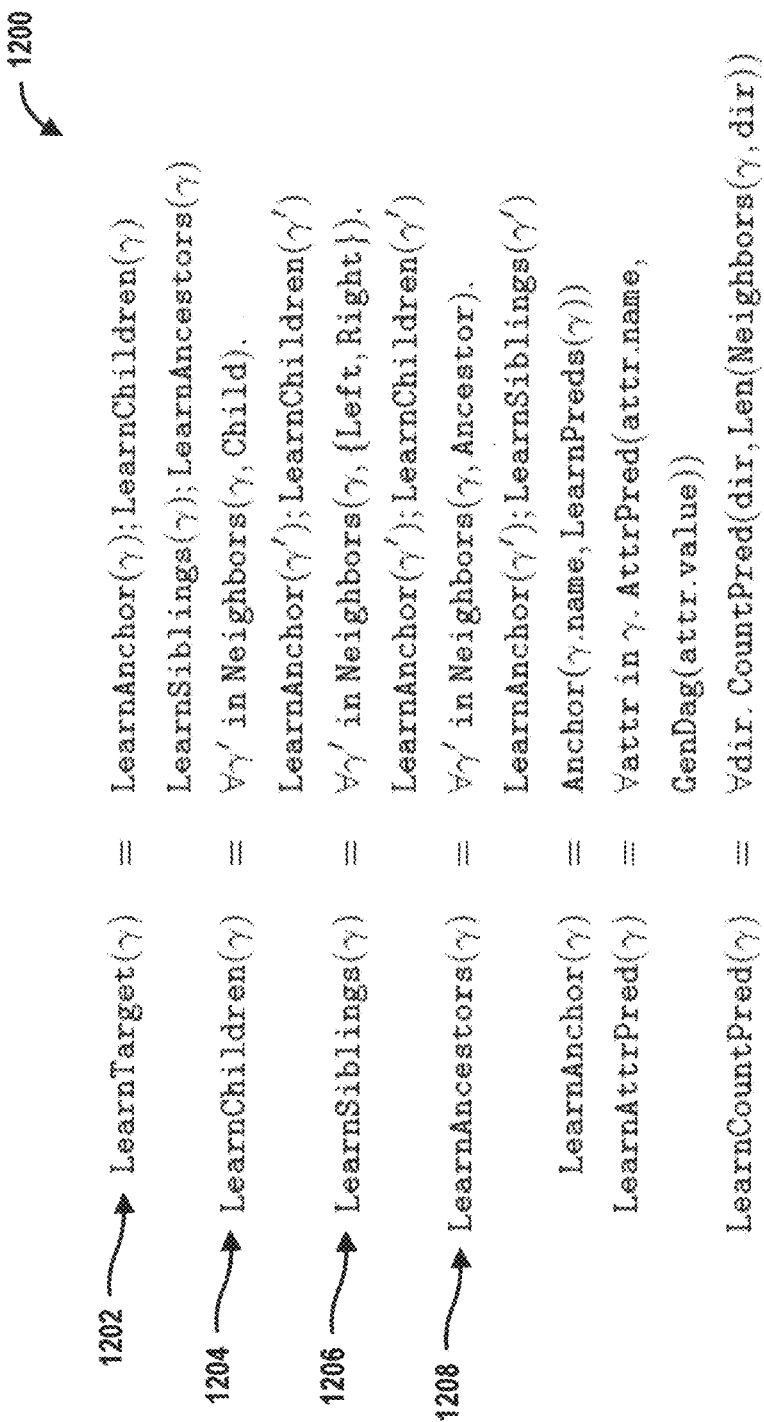
FIG. 12 illustrates an example process for transforming an HTML document into a predicates graph, according to one or more embodiments described herein.

FIG. 12 illustrates an example process 1200 for transforming an HTML document into a predicates graph, in accordance with one or more embodiments. The example process 1200 may be described based on an example shown in FIG. 13, where the input HTML document 1300 is shown on the left, and the corresponding predicates graph 1320 is shown on the right. The target node is the text node (T3) shown in broken lines in both the HTML document 1300 and the predicates graph 1320. It is important to note the difference between these two representations. Although both the HTML document 1300 and the predicates graph 1320 have a tree like structure, the predicates graph 1320 is more centered around the target anchor. In the predicates graph 1320, all anchors are connected to the target anchor using a minimum number of intermediate anchors that is allowed by the DSL. In an embodiment, the process 1200 first creates an anchor for the target 1202 and then learns its children 1204, siblings 1206, and ancestors 1208 anchors recursively. Learning a child or a sibling will also learn its children in a recursive manner, whereas learning an ancestor will only learn its siblings recursively. Finally, when creating an anchor for an HTML node, all the node predicates of the HTML node are inherited by the anchor, but if there are any attribute predicates, their string values are first converted to DAGs using the GenDag method described above and illustrated in FIG. 7.

After the above transformation, a path $p=a_1/a_2/\ldots a_r$ in the predicates graph (e.g., predicates graph 1320 shown in FIG. 13, where $a_1$ is the target node) represents many different predicates in $L_w$ corresponding to different combinations of the node predicates in each anchor $a_i$. For example, the path from the target ($T_3$) to the next node $T_2$ in the example shown in FIG. 13 can be translated to the following path predicates:

$\pi_{p_1}$ = [(P, Ancestor, [Pos == 1])/(div, Left, [Pos == 1])/(text, Child, [attr["text"] = dag$_2$.TopProg])].
$\pi_{p_2}$ = [(P, Ancestor, [Pos == 1])/(div, Left)/(text, Child, [attr["text"] = dag$_2$.TopProg])]
$\pi_{p_3}$ = [(P, Ancestor)/(div, Left)/(text, Child)]

The following should be noted with respect to the predicates graph (e.g., predicates graph 1320), according to one or more embodiments. First, the predicates graph for an example $(i_k, \omega_k, \gamma_k)$ can express all predicates in $L_w$ that satisfy the example. Second, any predicate expressed by the predicates graph (e.g., predicates graph 1320) for an example $(i_k, \omega_k, \gamma_k)$ will satisfy the example.

In accordance with at least one embodiment, depending on the implementation, only a portion of the predicates graph that captures nodes that are within a particular distance (e.g., r=5) from the target node may be constructed. It should be noted that in one or more other embodiments, this particular distance may be different than the example described above.

Handling Multiple Examples

One way to handle multiple examples is to create a predicates graph for each example and perform a full intersection of all these graphs. However, this operation is very expensive and has a complexity of $N^m$ where N is the number of nodes in the HTML document and m is the number of examples. Moreover, as described in greater detail below, it will be shown that a process for searching the right set of predicates (as illustrated in FIG. 16, which is described in greater detail below) will try to add these predicates one-by-one based on a ranking scheme and is designed to stop after a satisfying set is obtained, in accordance with some embodiments. Therefore, in this instance doing a full intersection may be more than is necessary. To overcome this problem, the technique of the present disclosure, in accordance with one or more embodiments, is to refine predicates in the predicates graph in a lazy fashion for one path at a time (rather than the whole graph) when the path is required by the search process.

Figure 13:
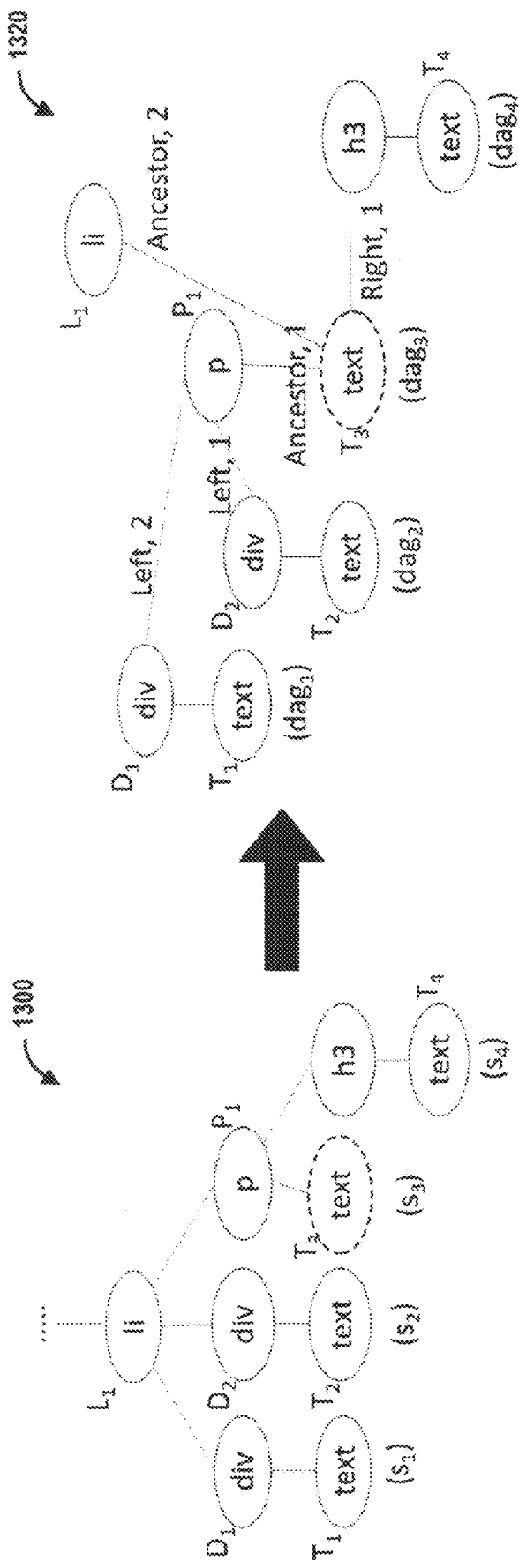
FIG. 13 illustrates an example input HTML document and corresponding predicates graph associated with the example process of FIG. 12, according to one or more embodiments described herein.

In order to refine a path p in the predicates graph (e.g., predicates graph 1320 as shown in FIG. 13) using another example, the system of the present disclosure first gets all similar paths in the predicates graph of the other example and intersects p with each of these paths, according to an embodiment.

FIG. 14 illustrates an example process 1400 for intersecting two paths in two predicates graphs, in accordance with one or more embodiments. The process 1400 goes through all the anchors in the two paths and intersects each of their node predicates. For intersecting attribute predicates, the process 1400 may intersect their respective DAGs corresponding to the values if their attributes have the same name. For intersecting position predicates, the process 1400 may take the maximum value of k and update the operation accordingly. For intersecting count predicates, the process 1400 may return the same predicate if the counts (k) are the same.

Figure 15:
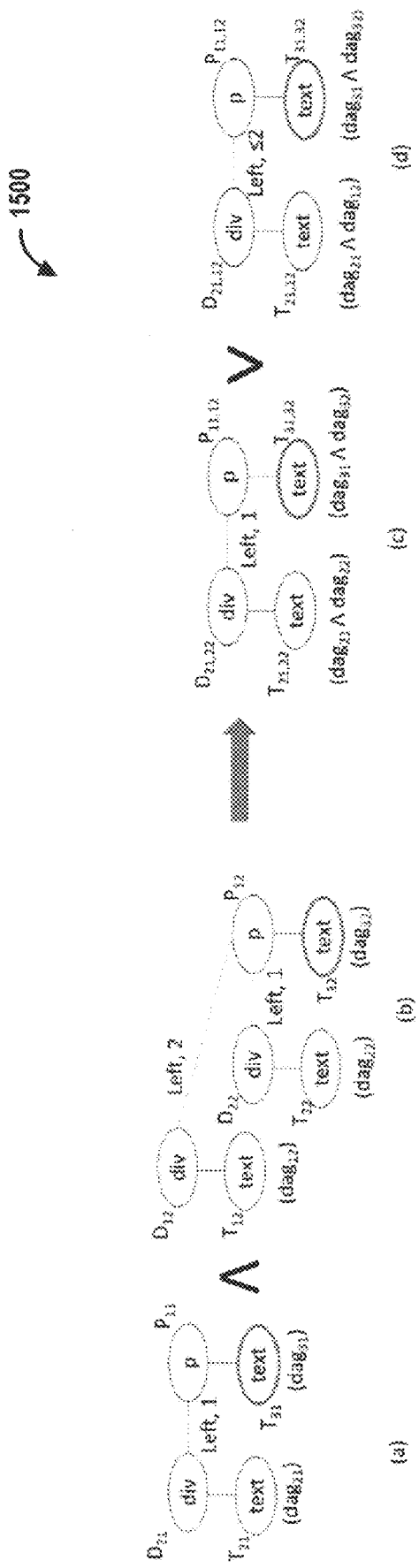
FIG. 15 illustrates an example of refining a path in a predicates graph using other examples, according to one or more embodiments described herein.

FIG. 15 illustrates an example 1500 for refining a path in a predicates graph using other examples, in accordance with one or more embodiments. The example 1500 shows that refining the path in (a) using another example that has a predicates graph as shown in (b) will result in two new paths (c) and (d).

The worst case complexity of this lazy refinement strategy is $N^m$, but in practice, it works well because the process usually accesses few paths in the predicates graph because of ranking and, moreover, the path intersection may only be required if the original path cannot satisfy the new examples.

Searching for the Right Set of Predicates

FIG. 16 illustrates an example process 1600 for searching for the right set of predicates, in accordance with one or more embodiments of the present disclosure. In at least one embodiment, the example process 1600 uses input-driven ranking to search for the right set of predicates. The process 1600 uses the unseen inputs as a test set to prune away predicates that do not generalize well. The process 1600 iterates through the list of all predicates based on a ranking scheme and adds the predicate if there is at-least one node in each test document that satisfies the predicates added so far. In an embodiment, the process 1600 may be stopped if a set of predicates is found that uniquely constrains the target nodes in the provided examples. It should be noted that any suitable ranking scheme may be used for iterating over predicates.

Correctness

It should be understood that the synthesis (Synth) process described above is accurate and sound. For example, given some input-output examples $\{(i_k, \omega_k, \gamma_k)\}_k$, the program P that is learned by the process will always satisfy $\forall k. [\![P]\!]_{i_k}(\omega_k)=\{\gamma_k\}$.

It should also be understood that the Synth process is complete in that if there exists a program in $L_w$ that satisfies the given input-output examples, then the process is guaranteed to find it given enough examples.

Example Evaluation

To further aid in understanding the various features and advantages of the system of the present disclosure, the following describes an example evaluation of the system on a variety of real-world web integration tasks. In particular, the following evaluates whether the DSLs for URL learning and data extraction are expressive enough to encode these tasks, the efficiency of the synthesis processes (algorithms), the number of examples needed to learn the programs, and the impact of hierarchical search and input-driven ranking, in accordance with one or more embodiments.

Benchmarks

The evaluation collected 88 web-integration tasks taken from online help forums and anonymous sources. These tasks cover a wide range of domains including, for example, finance, sports, weather, travel, academics, geography, and entertainment. Each benchmark has 5 to 20 rows of input data in the corresponding spreadsheet. These 88 tasks decompose into 62 URL learning tasks and 88 extraction tasks. Of the 62 URL tasks, 34 can be learned either using URL string synthesizer or URL filter synthesizer, 24 tasks can only be learned using the URL filter synthesizer because their URL programs require AnyStr, and 4 benchmarks can only be learned using the URL string synthesizer because the desired URLs in these cases are not amongst the top results returned by the search engine.

Experimental Setup

For the evaluation, the system was implemented in C #. All experiments were done using a dual-core Intel i5 2.40 GHz CPU with 8 GB RAM. For each component, examples were incrementally provided until the system learned a program that satisfied all other inputs. The results of the final iteration are reported.

URL Learning

For each learning task, a hierarchical search is run using 4 different configurations for the layers: Configuration 1. L1 to L4, Configuration 2. L2 to L4, Configuration 3. L3 to L4, and Configuration 4. Only L4. The last configuration essentially compares against synthesis algorithm used in FlashFill (except for new constructs Replace and AnyStr).

Evaluating Synthesis of String Programs

Figure 17:
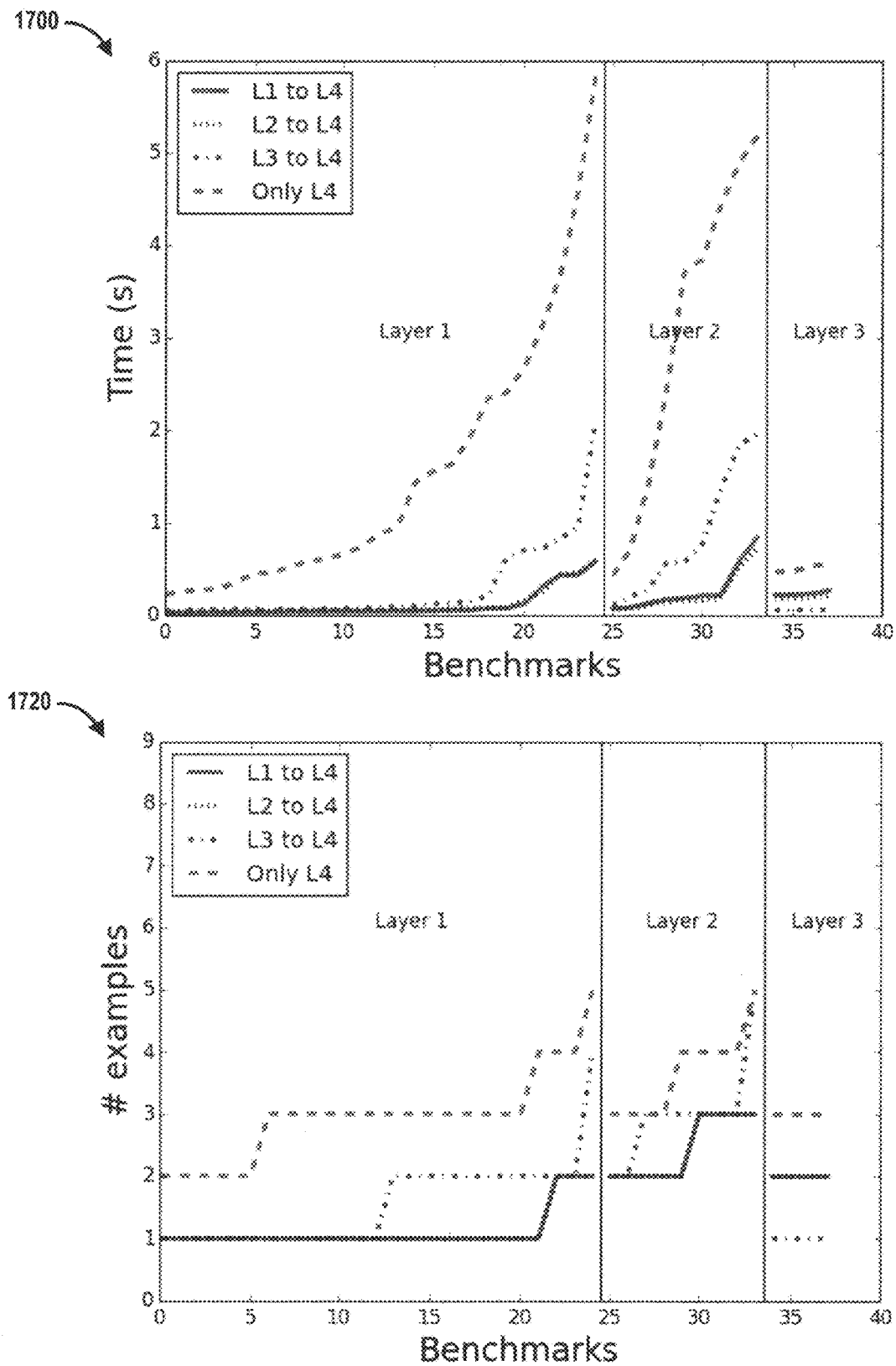
FIG. 17 is a set of graphical representations illustrating example synthesis times and number of examples needed to learn URLs as string transformation programs, according to one or more embodiments described herein.

FIG. 17 is a set of graphical representations illustrating synthesis times (1700) and number of examples needed (1720) to learn URLs as string transformation programs.

FIG. 18 is a set of graphical representations illustrating synthesis times (1800) and number of examples needed (1820) to learn search queries. The benchmarks were categorized based on the layer that has the desired program. It can be seen that for the L1 to L4 configuration, the system, on averages, takes 0.22 seconds and requires 1.5 examples. The L2 to L4 configuration performs equally as well, but the other configurations (L3 to L4 and Only L4) perform significantly worse both in terms of synthesis times and number of examples required. The Only L4 configuration performs the worst taking, on average, 2 seconds and 3 examples. For these benchmarks, the length of outputs is in the range of 23 to 87 for the URLs and 10 to 49 for the search queries.

Evaluating Synthesis of Filter Programs

The following describes an example evaluation of the performance of synthesizing filter programs, in accordance with one or more embodiments of the present disclosure. In this evaluation, the 58 benchmarks are divided into the following categories: (1) structured URLs that does not require AnyStr, (2) structured URLs that require AnyStr, and (3) unstructured URLs. An example for the last category, (3), are the URLs for YouTube videos such as, "https://www.youtube.com/watch?v=9bZkp7q19f0". These URLs do not have any deterministic structure that can be inferred from the input (unless the input itself has the video id). For such URLs, the best program that the system described herein may be capable of learning is Concat("https://www.youtube.com/watch?v=", AnyStr). There are typically many URLs that match this program and it is sound only if the search engine provides the desired URL as the top URL. It should be noted that, in such cases, a user can strengthen the search query examples.

Figure 19:
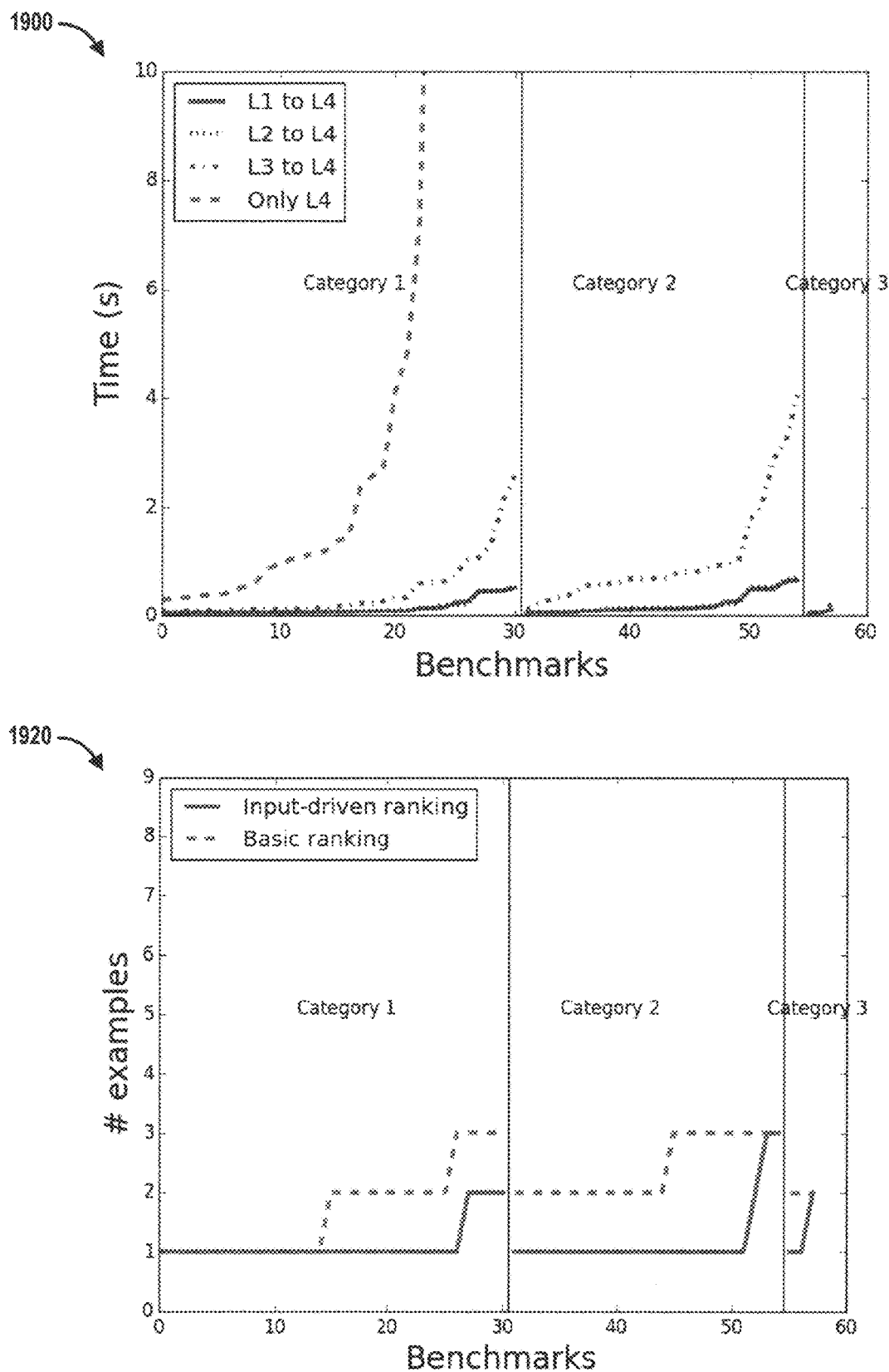
FIG. 19 is a set of graphical representations illustrating example synthesis times and number of examples needed to learn URL filter programs, according to one or more embodiments described herein.

FIG. 19 is a set of graphical representations illustrating synthesis times (1900) and number of examples needed (1920) for learning URL filter programs. Graphical representation 1900 shows the synthesis times (excluding the time taken to run the search queries on the search engine) for learning filter programs for the different configurations of the hierarchical search. It can be seen that the best configuration solves all the tasks in less than 1 second and 86% of the benchmarks require only 1 example, as a result of the input-driven ranking scheme of the system described herein. The performance of Only L4 configuration is much worse in this case. Only 28 benchmarks complete when given a timeout of 2 minutes. It should be noted that the graph for the number of examples is omitted as the number of examples for the first three layers are very similar and the last layer times out for most of the benchmarks. For these tasks, the length of the URLs is in the range of 23 to 89.

Graphical representation 1920 illustrates the results of an example experiment to evaluate the impact of input-driven ranking using the L1 to L4 configuration for the hierarchical search. Without input-driven ranking, only 26% of benchmarks can be synthesized using a single example as opposed to 86% with input-driven ranking.

Data Extraction

The following describes an example evaluation of the data extraction synthesizer of the system of the present disclosure, in accordance with one or more embodiments. The benchmarks are categorized into three categories. The first category consists of benchmarks where the data extraction can be learned using an absolute XPath. The second category includes the benchmarks that cannot be learned using an absolute XPath, but by using relative predicates (especially involving nearby strings). The third category handles the cases where the data extraction is input-dependent.

Figure 20:
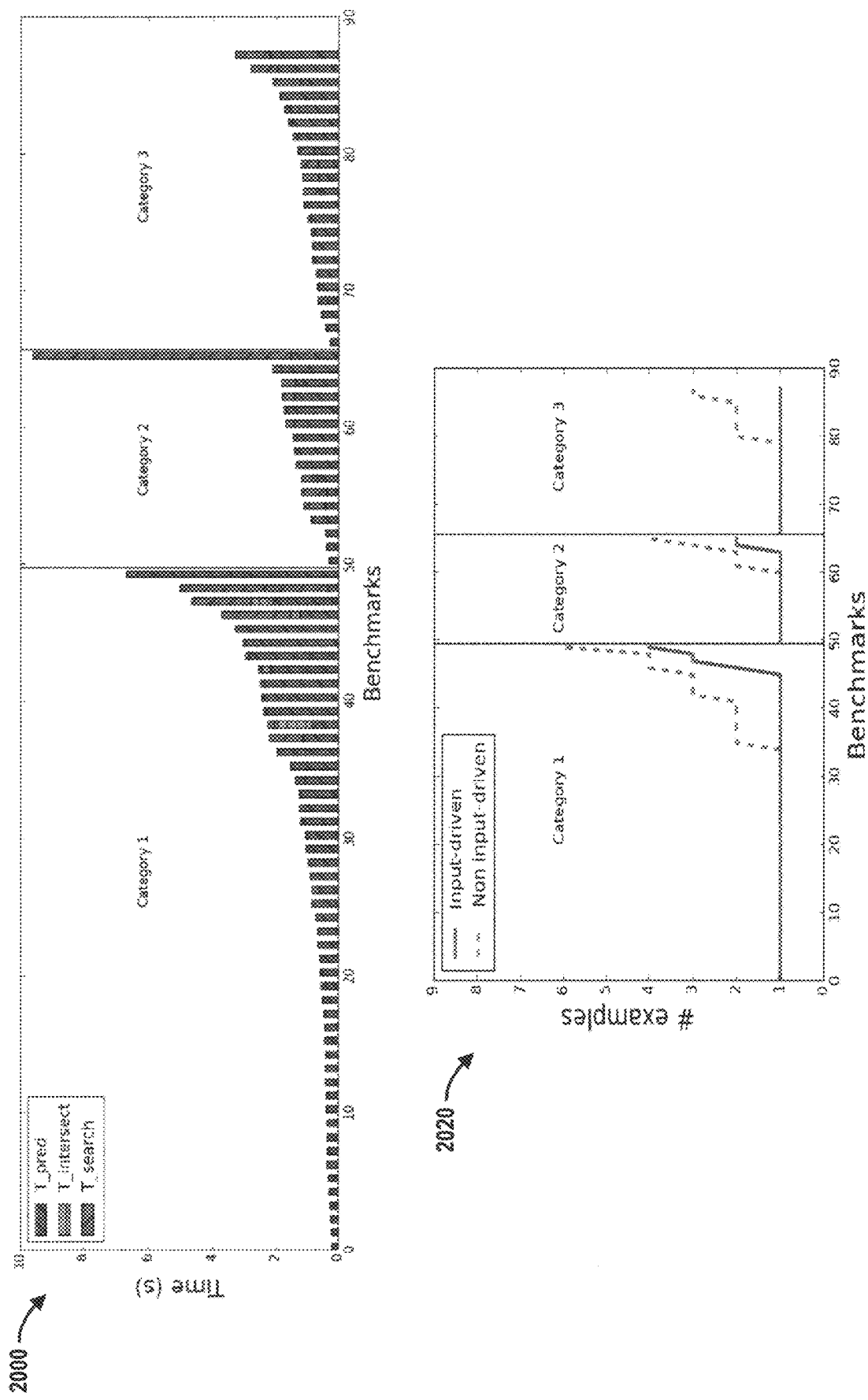
FIG. 20 is a set of graphical representations illustrating example data extraction learning times and number of examples needed for a full set of experimental benchmarks, according to one or more embodiments described herein.

FIG. 20 is a set of graphical representations illustrating example data extraction learning times (2000) (excluding the time taken to load the webpages) and number of examples needed (2020) by the system on all 88 benchmarks. It should be noted that graphical representation 2000 also splits the synthesis time into the time taken for learning the predicates graphs (T_pred), for intersecting the predicates graphs if there are multiple examples (T_intersect), and finally, for searching for the right set of predicates (T_search). It should be noted that the system of the present disclosure can learn the correct extraction for all benchmarks, showing that the DSL is very expressive. Moreover, the system can learn the correct extraction for all benchmarks very quickly—97% of benchmarks take less than 5 seconds. Graphical representation 2020 shows the number of examples required and also compares against non-input-driven ranking. It can be seen that with input-driven ranking, 93% of benchmarks require only 1 example.

Most of the synthesis time is actually spent in generating the predicates graphs and this time is proportional to the number of attribute strings in the HTML document since the system will create a DAG for each string. In the examples used, the number of HTML nodes considered for the predicates graph is in the range of 30 to 1200 with 3 to 200 attribute strings. For some benchmarks, the time spent in searching for the right set of predicates dominates. These are the benchmarks that require too many predicates to sufficiently constrain the target nodes. The actual time spent on intersecting the predicates graph is not very significant. For benchmarks that require multiple examples, it has been found that the time spent on intersection is only 15% of the total time (on average) due to the lazy intersection algorithm that may be utilized.

As described above, previous approaches for joining web data with relational data into, for example, spreadsheets, have typically relied on either making it easier for users to program, or by using record-and-replay techniques to capture user interactions. The biggest limitations are that such existing approaches are not able to perform data-dependent extractions from webpages, cannot handle data transformations, and even in cases where record-replay seems to be enough, such approaches are too brittle for users.

Data Integration from Web: One existing approach performs semantic data transformations using web tables and forms. Given a set of input-output examples, this first existing approach searches a large index of web tables and web forms to find a consistent transformation. Instead of being completely automated, the methods and systems of the present disclosure, on the other hand, allow users to identify the relevant websites and point to the desired data on the website, which allows the methods and systems to perform data integration from more sophisticated websites.

A second existing approach is a PBD web scraping tool for end-users that allows them to first extract logical tables from a webpage, and then provide example interactions for the first table entry on another website. This second existing approach uses a backend record and replay engine to record the interactions performed by the user on a webpage. The recorded interaction is turned into a script that can be replayed programmatically.

A third existing approach uses direct manipulation and PBD to allow end-users to easily create web mash-ups to collect information from multiple websites. This third existing approach first uses a demonstration to open a website, copy/paste the data for the first row into the website, and records user interactions using a browser based macro recorder. The learnt script is then executed for remaining rows in the spreadsheet.

In contrast to these existing approaches described above, instead of recording user demonstrations, the methods and systems of the present disclosure use examples of URLs (or search queries) to learn a program to get to the desired webpages, in accordance with one or more embodiments. The demonstrations-based specification has been shown to be challenging for users and many websites do not expose such interactions. These existing approaches learn simpler XPath expressions for data extraction, whereas the methods and systems described herein can also learn input data-dependent XPath expressions that are crucial for data integration tasks. Moreover, the existing approaches assume the input data is already in consistent format that can be directly used for interactions, whereas the methods and systems of the present disclosure learn additional transformations on the data for both learning the URLs and data-dependent extractions, in accordance with one or more embodiments.

PBE for String Transformations: There have been several recent PBE systems and approaches that use version-space algebra (VSA) for efficiently learning string transformations from examples. Unlike these existing approaches that perform data transformation and extraction from a single document, the methods and systems of the present disclosure join data between a spreadsheet and a collection of webpages. The methods and systems of the present disclosure build on top of the substring constructs introduced by these existing approaches to perform both URL learning and data extraction. Moreover, the methods and systems of the present disclosure use hierarchical search and an input-driven ranking technique to efficiently synthesize programs, in accordance with some embodiments.

Wrapper Induction: Wrapper induction is a technique to automatically extract relational information from webpages using labeled examples. There exists a body of research on wrapper induction with some techniques using input-output examples to learn wrappers and others perform unsupervised learning using pattern mining or similarity functions. Among the numerous differences between any of these existing techniques and the methods and systems of the present disclosure is that the extraction language used by the methods and systems of the present disclosure is more expressive as it allows richer XPath expressions that can depend on inputs.

Program Synthesis: The field of program synthesis has seen a renewed interest in recent years. In addition to VSA based approaches, several other approaches including constraint-based, enumerative, and stochastic have been developed to synthesize programs in different domains. Synthesis techniques using examples have also been developed for learning data structure manipulations, type-directed synthesis for recursive functions over algebraic datatypes, transforming tree-structured data, and interactive parser synthesis. However, these existing approaches are not suited for learning URLs and data extraction programs because the DSL operators such as, for example, regular expression based substrings and data-dependent XPath expressions are not readily expressible in these approaches. Moreover, the search space of the programs in these DSLs is extremely large, which makes any enumeration prohibitively expensive.

It should be noted that there may be certain situations under which the methods and systems of the present disclosure may not be able to learn a task. First of all, since all of the example processes described herein are sound, the methods and systems of the present disclosure may not always be able to deal with noise. For example, if the any input data in the spreadsheet is misspelled or has a semantically different format, then it may not be possible to learn such string transformation programs. The methods and systems of the present disclosure are designed to handle syntactic data transformations, but may not be capable of handling semantic transformations. In accordance with one or more embodiments, machine learning techniques may be used in conjunction with the methods and systems described herein to learn a noise model based on semantics, and such a model may be incorporated into the synthesis process described above.

In accordance with one or more embodiments of the present disclosure, it is assumed that the webpages containing the desired data have URLs that can be programmatically learned. However, there may be situations that require complex interactions such as, for example, traversing through multiple web pages before getting to the page that has the data. As such, in accordance with one or more embodiments, the techniques described herein may be integrated with techniques from various record and replay systems such as, for example, Ringer to enable data-dependent replay.

The present disclosure describes examples and embodiments of methods and systems for joining semi-structured web data with relational data. One of the main aspects of the methods and systems described herein is to decompose the task of joining semi-structured web data with relational data into two sub-tasks: (1) URL learning and (2) data extraction learning. As described above, the URL learning problem may be framed in terms of learning syntactic string transformations and filters, whereas data extraction programs may be learned in a rich DSL that allows for data-dependent XPath expressions, in accordance with some embodiments. One of the key ideas in the synthesis process described above is to use hierarchical search and input-driven ranking to efficiently learn the programs using very few input-output examples. As presented above, the methods and systems of the present disclosure have been evaluated successfully on several real-world web data integration tasks.

Figure 21:
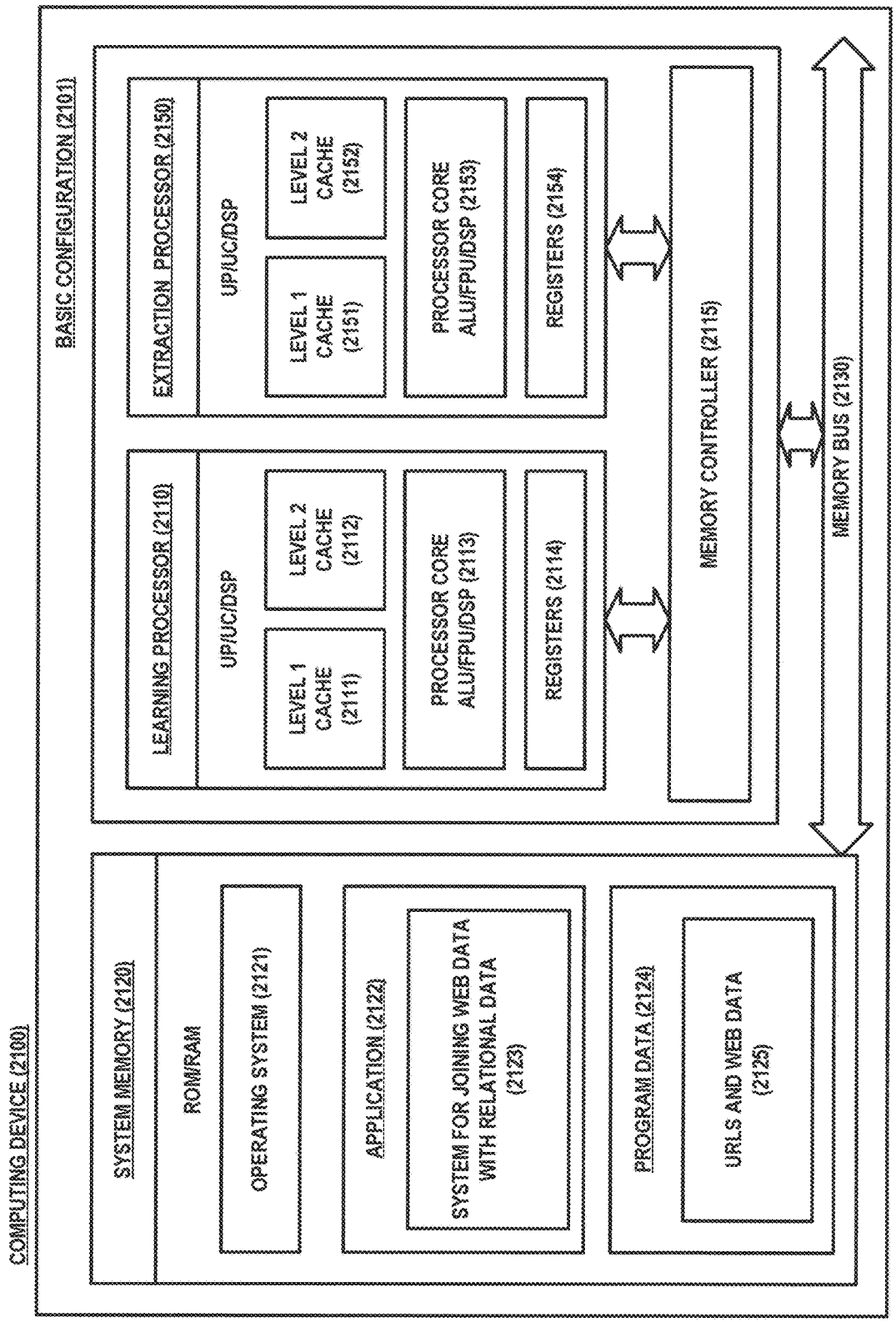
FIG. 21 is a block diagram illustrating an example computing device arranged for joining web data with relational data, according to one or more embodiments described herein.

FIG. 21 is a high-level block diagram of an exemplary computing device (2100) that is arranged for joining web data with relational data, in accordance with one or more embodiments described herein. For example, in accordance with at least one embodiment of the present disclosure, the computing device (2100) may be configured to decompose the web data integration task into two sub-tasks, where the first subtask learns a string transformation program using a few example URLs to automatically generate URLs of webpages containing the desired data to be extracted, while the second sub-task, given some examples of data to be extracted from the webpages, learns a program to perform such extractions for other inputs of the relational data, according to an embodiment. In a basic configuration (2101), the computing device (2100) typically includes one or more processors (2110, 2150) and system memory (2120). A memory bus (2130) can be used for communicating between the one or more processors (2110, 2150) and the system memory (2120).

Depending on the desired configuration, the one or more processors (2110, 2150) can be of any type including but not limited to a microprocessor (µP), a microcontroller (µC), a digital signal processor (DSP), or the like, or any combination thereof. For example, in accordance with at least one embodiment, one processor may be a Learning Processor (2110) while another processor is a dedicated Extraction Processor (2150). In such a configuration, the Learning Processor (2110) may be configured to learn syntactic string transformations and filters while the dedicated Extraction Processor (2150) may operate continuously to perform, for example, learning data extraction programs in a rich DSL that allows for data-dependent Xpath expressions, in accordance with an embodiment. Either or both of the processors (2110, 2150) can include one more levels of caching, such as a level one cache (2111, 2151) and a level two cache (2112, 2152), a processor core (2113, 2153), and registers (2114, 2154). The processor core (2113, 2153) can include an arithmetic logic unit (ALU), a floating point unit (FPU), a digital signal processing core (DSP Core), or the like, or any combination thereof. A memory controller (2115) can also be used with the one or more processors (2110, 2150), or in some implementations separate memory controllers (2115) can be an internal part of each of the one or more processors (2110, 2150).

Depending on the desired configuration, the system memory (2120) can be of any type including but not limited to volatile memory (such as RAM), non-volatile memory (such as ROM, flash memory, etc.) or any combination thereof. System memory (2120) typically includes an operating system (2121), one or more applications (2122), and program data (2124). The application (2122) may include a system for joining (integrating) web data with relational data (2123). In accordance with at least one embodiment of the present disclosure, the system for integrating web data with relational data (2123) is designed to break down the integration task into two sub-tasks, where the first sub-task includes learning a program to transform inputs into URL strings that correspond to the web pages where the relevant data is present. Instead of relying on user interactions on a website, this first sub-task is configured to take a new approach to use URL examples to reach the desired webpages. The second sub-task may include learning a program in a rich web data extraction language to extract desired data from the web page(s) given the example extractions (e.g., provided by a user).

Program Data (2124) may include storing instructions that, when executed by the one or more processing devices, implement a system (2123) and method for joining (integrating) web data with relational data. Additionally, in accordance with at least one embodiment, program data (2124) may include URLs and web page data (2125), which may relate to, for example, website addresses that contain desired data to be extracted and also the specific data types to be extracted from the websites. In accordance with at least some embodiments, the application (2122) can be arranged to operate with program data (2124) on an operating system (2121).

The computing device (2100) can have additional features or functionality, and additional interfaces to facilitate communications between the basic configuration (2101) and any required devices and interfaces.

System memory (2120) is an example of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 2100. Any such computer storage media can be part of the device (2100).

The computing device (2100) may be implemented as a portion of a small-form factor portable (or mobile) electronic device such as a cell phone, a smartphone, a personal data assistant (PDA), a personal media player device, a tablet computer (tablet), a wireless web-watch device, a personal headset device, an application-specific device, or a hybrid device that includes any of the above functions. In addition, the computing device (2100) may also be implemented as a personal computer including both laptop computer and non-laptop computer configurations, one or more servers, Internet-of-Things systems, and the like.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In accordance with at least one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers, as one or more programs running on one or more processors, as firmware, or as virtually any combination thereof, and that designing the circuitry and/or writing the code for the software and/or firmware would be well within the skill of one of skill in the art in light of this disclosure.

In addition, those skilled in the art will appreciate that the mechanisms of the subject matter described herein are capable of being distributed as a program product in a variety of forms, and that an illustrative embodiment of the subject matter described herein applies regardless of the particular type of non-transitory signal bearing medium used to actually carry out the distribution. Examples of a non-transitory signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

While particular embodiments of the subject matter have thus been described, it is to be appreciated that other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multi-tasking and parallel processing may be advantageous.

The invention claimed is:

1. A method for integrating web data into a document, the method comprising:
    obtaining, for a first data entry in a table containing a plurality of related data entries, a website address corresponding to the first data entry;
    determining, based on the first data entry and the website address corresponding to the first data entry, a string transformation program for generating website addresses corresponding to the remaining related data entries contained in the table;
    using the string transformation program to generate the website addresses corresponding to the remaining related data entries, wherein, for each of the remaining related data entries, the string transformation program generates the corresponding website address based on (i) at least one constant string from the URL of the website address corresponding to the first data entry and (ii) the related data entry or a transformation of the related data entry;
    receiving, from a user via a user interface device, a selection of data displayed on a web page associated with the website address corresponding to the first data entry;
    determining, based on the received selection of data, a data type for data to be extracted from (i) the web page associated with the website address corresponding to the first data entry, and (ii) web pages associated with the website addresses corresponding to the remaining related data entries; and
    performing data extraction from (i) the web page associated with the website address corresponding to the first data entry, and (ii) the web pages associated with the website addresses corresponding to the remaining related data entries, based on the determined data type, wherein the extracted data is for integration into the table.

2. The method of claim 1, wherein the document is a spreadsheet containing a plurality of cells for entering data.

3. The method of claim 1, wherein the website address corresponding to the first data entry is integrated into the table as an additional data entry associated with the first data entry.

4. The method of claim 1, wherein receiving a selection of data displayed on a web page associated with the website address corresponding to the first data entry includes:
    responsive to obtaining the website address corresponding to the first data entry, prompting the user to select a data element to be extracted from the web page associated with the website address; and
    receiving, in response to the prompt, the selection of a data element to be extracted from the web page associated with the website address.

5. The method of claim 4, wherein prompting the user to select a data element to be extracted from the web page associated with the website address includes loading the web page in a browser based on the obtained website address.

6. The method of claim 1, wherein receiving a selection of data displayed on a web page associated with the website address corresponding to the first data entry includes:
    receiving, from the user via the user interface device, selections of a plurality of data elements displayed on the web page associated with the website address corresponding to the first data entry.

7. The method of claim 1, wherein obtaining, for a first data entry in a table containing a plurality of related data entries, a website address corresponding to the first data entry includes:
    receiving one or more search query terms associated with the first data entry;
    generating a list of one or more websites based on the received search query terms; and
    receiving a selection of at least one website from the list of one or more websites.

8. A system for integrating web data into a document, the system comprising:
    one or more processors; and
    a non-transitory computer-readable medium coupled to the one or more processors having instructions stored thereon that, when executed by the one or more processors, cause the one or more processors to perform operations comprising:
        obtaining, for a first data entry in a table containing a plurality of related data entries, a website address corresponding to the first data entry;
        determining, based on the first data entry and the website address corresponding to the first data entry, a string transformation program for generating website addresses corresponding to the remaining related data entries contained in the table;

using the string transformation program to generate the website addresses corresponding to the remaining related data entries, wherein, for each of the remaining related data entries, the string transformation program generates the corresponding website address based on (i) at least one constant string from the URL of the website address corresponding to the first data entry and (ii) the related data entry or a transformation of the related data entry;

receiving, from a user via a user interface device, a selection of data displayed on a web page associated with the website address corresponding to the first data entry;

determining, based on the received selection of data, a data type for data to be extracted from (i) the web page associated with the website address corresponding to the first data entry, and (ii) web pages associated with the website addresses corresponding to the remaining related data entries; and performing data extraction from (i) the web page associated with the website address corresponding to the first data entry, and (ii) the web pages associated with the website addresses corresponding to the remaining related data entries, based on the determined data type, wherein the extracted data is for integration into the table.

9. The system of claim 8, wherein the document is a spreadsheet containing a plurality of cells for entering data.

10. The system of claim 8, wherein the one or more processors are caused to perform further operations comprising:

integrating the website address corresponding to the first data entry into the table as an additional data entry associated with the first data entry.

11. The system of claim 8, wherein the one or more processors are caused to perform further operations comprising:

responsive to obtaining the website address corresponding to the first data entry, prompting the user to select a data element to be extracted from the web page associated with the website address; and receiving, in response to the prompt, the selection of a data element to be extracted from the web page associated with the website address.

12. The system of claim 11, wherein the one or more processors are caused to perform further operations comprising:

prompting the user to select a data element to be extracted from the web page associated with the website address by loading the web page in a browser based on the obtained website address.

13. The system of claim 8, wherein the one or more processors are caused to perform further operations comprising:

receiving, from the user via the user interface device, selections of a plurality of data elements displayed on the web page associated with the website address corresponding to the first data entry.

14. The system of claim 8, wherein the one or more processors are caused to perform further operations comprising:

receiving one or more search query terms associated with the first data entry;

generating a list of one or more websites based on the received search query terms; and receiving a selection of at least one website from the list of one or more websites.

15. A tangible, non-transitory computer readable medium, or media, storing machine readable instructions that, when executed by one or more processors, cause the one or more processors to perform operations comprising:

obtaining, for a first data entry in a table containing a plurality of related data entries, a website address corresponding to the first data entry;

determining, based on the first data entry and the website address corresponding to the first data entry, a string transformation program for generating website addresses corresponding to the remaining related data entries contained in the table;

using the string transformation program to generate the website addresses corresponding to the remaining related data entries, wherein, for each of the remaining related data entries, the string transformation program generates the corresponding website address based on (i) at least one constant string from the URL of the website address corresponding to the first data entry and (ii) the related data entry or a transformation of the related data entry;

receiving, from a user via a user interface device, a selection of data displayed on a web page associated with the website address corresponding to the first data entry;

determining, based on the received selection of data, a data type for data to be extracted from (i) the web page associated with the website address corresponding to the first data entry, and (ii) web pages associated with the website addresses corresponding to the remaining related data entries; and performing data extraction from (i) the web page associated with the website address corresponding to the first data entry, and (ii) the web pages associated with the website addresses corresponding to the remaining related data entries, based on the determined data type, wherein the extracted data is for integration into the table.

16. The tangible, non-transitory computer-readable medium or media of claim 15, wherein the document is a spreadsheet containing a plurality of cells for entering data.

17. The tangible, non-transitory computer-readable medium or media of claim 15, wherein the machine readable instructions, when executed by the one or more processors, cause the one or more processors to perform further operations comprising:

integrating the website address corresponding to the first data entry into the table as an additional data entry associated with the first data entry.

18. The tangible, non-transitory computer-readable medium or media of claim 15, wherein the machine readable instructions, when executed by the one or more processors, cause the one or more processors to perform further operations comprising:

responsive to obtaining the website address corresponding to the first data entry, prompting the user to select a data element to be extracted from the web page associated with the website address; and receiving, in response to the prompt, the selection of a data element to be extracted from the web page associated with the website address.

19. The tangible, non-transitory computer-readable medium or media of claim 15, wherein the machine readable instructions, when executed by the one or more processors, cause the one or more processors to perform further operations comprising:

receiving, from the user via the user interface device, selections of a plurality of data elements displayed on the web page associated with the website address corresponding to the first data entry.

20. The tangible, non-transitory computer-readable medium or media of claim 15, wherein the machine readable instructions, when executed by the one or more processors, cause the one or more processors to perform further operations comprising:

receiving one or more search query terms associated with the first data entry;

generating a list of one or more websites based on the received search query terms; and receiving a selection of at least one website from the list of one or more websites.

\* \* \* \* \*